(12) United States Patent
Azam

(10) Patent No.: US 9,503,772 B2
(45) Date of Patent: Nov. 22, 2016

(54) CONTROL MECHANISMS

(71) Applicant: Myndplay Ltd., London (GB)

(72) Inventor: Mohammed Aurooj Azam, Loughton (GB)

(73) Assignee: Myndplay Ltd., London (GB)

( * ) Notice: Subject to any disclaimer, the term of this patent is extended or adjusted under 35 U.S.C. 154(b) by 86 days.

(21) Appl. No.: 14/387,789

(22) PCT Filed: Mar. 27, 2013

(86) PCT No.: PCT/GB2013/050812
§ 371 (c)(1),
(2) Date: Sep. 24, 2014

(87) PCT Pub. No.: WO2013/144629
PCT Pub. Date: Oct. 3, 2013

(65) Prior Publication Data
US 2015/0071600 A1    Mar. 12, 2015

(30) Foreign Application Priority Data

Mar. 27, 2012 (GB) .................................. 1205404.5
Mar. 28, 2012 (GB) .................................. 1205496.1

(51) Int. Cl.
| | |
|---|---|
| H04N 5/775 | (2006.01) |
| H04N 21/422 | (2011.01) |
| H04N 21/8541 | (2011.01) |
| H04N 21/458 | (2011.01) |
| H04N 21/472 | (2011.01) |

(52) U.S. Cl.
CPC ...... *H04N 21/42201* (2013.01); *H04N 21/458* (2013.01); *H04N 21/47217* (2013.01); *H04N 21/8541* (2013.01)

(58) Field of Classification Search
CPC . H04N 5/775; H04N 21/42201; G11B 27/34
USPC ......................................... 386/230, 239, 248
See application file for complete search history.

(56) References Cited

U.S. PATENT DOCUMENTS

| | | | | |
|---|---|---|---|---|
| 6,001,065 A | * | 12/1999 | DeVito ................... | G06F 3/015 340/4.11 |
| 6,097,981 A | * | 8/2000 | Freer ..................... | A61B 5/0482 600/544 |
| 2005/0007091 A1 | * | 1/2005 | Makeig .................. | A61B 5/048 324/76.13 |

(Continued)

*Primary Examiner* — Thai Tran
*Assistant Examiner* — Mishawn Hunter
(74) *Attorney, Agent, or Firm* — The Tracy IP Law Firm, PLLC

(57) ABSTRACT

A method of controlling a video clip player is described. The method comprises sending a control signal from a controller to the video clip player to output a pre-recorded video clip to a display; using a sensor to sense EEG signals from the brain of an observer of the displayed video clip; transmitting the sensed EEG signals from the sensor to the controller; processing the received EEG signals to determine an outcome, the outcome being achieved by the received signal comprising a predetermined frequency or a predetermined combinations of frequencies of EEG signals above a threshold level for a predetermined period of time; and controlling the video clip player in response to the determined outcome. The controlling step comprises selecting a next pre-recorded video clip to be output by the video clip player from a plurality of stored pre-recorded video clips; and instructing the video clip player to output the selected pre-recorded video clip to the display for presentation to the observer.

30 Claims, 13 Drawing Sheets

(56) References Cited

U.S. PATENT DOCUMENTS

| | | | |
|---|---|---|---|
| 2009/0099474 A1* | 4/2009 | Pineda | A61B 5/121 600/545 |
| 2010/0183279 A1* | 7/2010 | Pradeep | G06T 1/0021 386/278 |
| 2010/0240458 A1* | 9/2010 | Gaiba | A63F 13/10 463/36 |
| 2011/0046503 A1* | 2/2011 | Pradeep | A61B 5/0478 600/544 |
| 2011/0085780 A1* | 4/2011 | Fukuyori | A61B 5/16 386/241 |

* cited by examiner

CONTROL MECHANISMS

CROSS REFERENCE TO RELATED APPLICATIONS

This application is the national stage application under 35 U.S.C. §371 of International Application No. PCT/GB2013/050812, filed Mar. 27, 2013 and claims priority under 35 U.S.C. §119 to Great Britain Application Nos. 1205404.5, filed Mar. 27, 2012 and 1205496.1, filed Mar. 28, 2012. All of these documents are incorporated by reference herein in their entireties.

FIELD OF THE INVENTION

The present invention concerns improvements relating to control mechanisms and more particularly, though not exclusively, to a method of controlling a video clip player which can be responsive to the emotions of the viewers which result from exposure to a display showing the output of the video clip player. The present invention has applications in the fields of home and recreational entertainment, medical and psychiatric treatment, advertising and marketing and physical and mental training.

BACKGROUND OF THE INVENTION

Video has long been recognised as an excellent medium for conveying ideas and communicating with audiences. The success of television and film in the past 90 years is testament to the appeal this medium has with human subjects.

Research shows that the medium of video of real world objects and people is a more natural form of interaction with human beings as opposed to computer-generated imagery, for example as found in the gaming industry. Users are more responsive and impulsive with the medium of video and the results which would be attainable would not be achieved through other media. The medium of real-world video elicits more accurate and real human reactions and emotive responses. For example, a user viewing video footage of a football match arouses more natural human emotions than footage of a football match being viewed via computer generated imagery ('CGI'). Further, video media files can be easily applied to the fields of medicine, psychiatry, professional and amateur level sports, advertising and marketing as they are more widely accessible, commercially viable and time- and cost-effective.

However, controlling video is far more difficult than for example computer generated imagery. This is because with video, there is a need to give the appearance of a scene as being that which a subject viewing the video may see in real life. This is simply not the case with computer-generated images which are far easier to manipulate as they are often not seeking to present a real-world view which the user would see with their own eyes, but rather a view in a computer-generated world. Where computer-generated views do try to mimic a real world view, huge amounts of processing power are required and even to this day such computer generated imagery is discernible from video of real world objects and people.

Control of devices such as video playback devices such as video players or so called media players often involves the user of remote controls, keyboards or the use of on screen controls. All of these require active manipulation by the user (typically by manual manipulation) to effect control of the playback of video scenes for example. Such active control is a single point source such that there is one control for the manipulation. There is no current way of an audience collectively controlling playback of a video on a display. Even if this were to be provided it would require the user of handheld controllers for getting user feedback and then using that to control the video playback device. The difficulty with this is that the control (if present) requires the user to select manually a particular option on a handheld device to effect control of the video. Not only may some of the subjects viewing the displayed video select the wrong option, but in doing so they can be distracted from the video being watched.

Ideally, what is required is a way for a user to control the outcome of the video being displayed without the need for manual manipulation of devices or use of any device which detracts from the video being displayed. The problem needs to be addressed for both a single viewer of a video clip as well as an audience of the video clip. Also preferably this needs to be provided in a manner which suggests that the playback of the video is simply from a pre-recorded file not a series of video fragments which are put together in response to the user's control via their control.

It is desired to overcome or mitigate at least some of the above described problems.

SUMMARY OF THE INVENTION

According to one aspect of the present invention there is provided a method of controlling a video clip player; the method comprising sending a control signal from a controller to the video clip player to output a pre-recorded video clip to a display; using a sensor to sense EEG signals from the brain of an observer of the displayed video clip; transmitting the sensed EEG signals from the sensor to the controller; processing the received EEG signals to determine an outcome, the outcome being achieved by the received signal comprising a predetermined frequency or a predetermined combinations of frequencies of EEG signals above a threshold level for a predetermined period of time; and controlling the video clip player in response to the determined outcome, the controlling step comprising: selecting a next pre-recorded video clip to be output by the video clip player from a plurality of stored pre-recorded video clips; and instructing the video clip player to output the selected pre-recorded video clip to the display for presentation to the observer.

The use of measured brainwave actively provides users viewing the display to control the operation of the video clip player in a far more subtle manner than has been possible before. The user's state of mind, their emotional state can be used to control the selection of content to be displayed. So for example an audience can now determine the ending of a film merely by being as relaxed as possible. This can be considered to be a passive control. Also a user can make themselves focus and improve their concentration whilst watching a film video clip being output and force a particular content outcome to occur. In this way a storyline of a film for example can be changed in real-time in response to the mood of the audience which has not be possible before.

Preferably the control can be selection of the next video clip to be selected which in turn can be a selection of the next content to be displayed. This content selection can be matched to the state of mind of the user viewing the displayed video content or even an audience of users viewing the video content being displayed.

The transmitting step may comprise transmitting the EEG signals wirelessly to the controller. This clearly has the advantage of being able to be scalable to large audiences without difficulties of wiring and providing supporting infrastructure.

Devices such as audio headsets may be used with one or more bio-signal sensors are currently being used to revolutionise the computer gaming market. An example of such a device can be found in the US Patent Application number US/2009/0214060 A1 published on 27 Aug. 2009 the contents of which are incorporated herein by reference. This device can be used as the sensor of the EEG signals from the head of a user. The available technology involves using such a device to measure electrical impulses generated by brain activity and uses proprietary algorithms to observe the user's state of mind. Generally, the prior art employs technology which uses EEG data to allow a new level of gaming interactivity only with a user's brain behaviour. However, no such prior art exists in the field of video entertainment. What the present invention provides is a method, system and process that provide a means for enabling individuals to interact with video media files.

The method may further comprise monitoring a wireless connection between the sensor and the controller over which the EEG signals are transmitted and if the connection is broken, sending a control signal to the video clip player. This enables real-time feedback of the connection to prevent loss of response data from the observers. In one case, the sending step may comprise sending a pause signal to the video clip player and the method may further comprise sending an unpause signal when the monitoring step determines that the wireless connection is re-established. This enables the system to ensure all response signals to video constant being display is captured.

In another case the sending step may comprise sending a stop signal to the video clip player to stop the output of the current video clip being played and the method may further comprise sending a restart signal to restart the current video clip from its beginning when the monitoring step determines that the wireless connection is re-established.

The processing step may comprise filtering the EEG signals though a high-pass filter to detect EEG artefacts caused by the observer blinking their eyes. Also the processing step may comprises filtering the EEG signal through a band-pass filter to detect either Alpha, Beta, Theta, Delta or Gamma brainwaves. In some embodiments the processing step comprises combining the results of the band-pass filtering of the EEG signal to detect a focus parameter correlated with focus of the observer.

The processing step may also or alternatively comprise combining the results of the band-pass filtering of the EEG signal to detect a relaxation parameter correlated with relaxation of the observer. The processing step may comprise averaging the focus parameter and the relaxation parameter to derive a Zone parameter which has a broader range that each of these parameters themselves.

The method may further comprise outputting a parameter as a graphical overlay on the selected video clip, the graphical overlay indicating the current level of the parameter and thus providing feedback on the display to the observer about their state of mind. The feedback is very useful as it can help the observer to change what they are doing in order to improve the feedback. As many people are not aware of how to manipulate their emotions the feedback is in itself a learning tool for the subjects.

The outputting step may comprise outputting the graphical overlay in the form of a meter showing the level of the parameter which is currently being recorded. This is a convenient way of achieving feedback and this can also avoid being detrimental to the main video output.

The processing step may comprise reading a directions file which stores threshold levels, combinations of EEG filtered signals, time periods over which such thresholds are to be exceeded and resultant successful/unsuccessful outcomes. This is a convenient way of configuring the system and enables ready access to the set-up of the system.

The time period over which the EEG signal is considered ends and the controlling step is completed, before the end of the current pre-recorded video clip being output by the video clip player. This then enables enough time to make the decisions regarding the next clip to be played.

The method may further comprise generating an interrupt command and sending the same to the video clip player; said interrupt command causing the current video clip being played to stop being played prematurely and the next pre-recorded video clip to start being played. This advantageously provides a way of moving onto the next content scene (video clip) quickly without having to watch more vide when the result which determines that outcome has already been achieved.

The method may further comprise configuring the video clip player to create a fade transition between the end of the current video clip being played and the beginning of the next pre-recorded video clip to be played. This is very useful when non-linear change are being made to the storyline such that the continuity of the storyline is maintained whilst permitting the selection of and changing of video clips.

The comparing step may further comprise using a state machine to determine the outcome. This is a convenient and efficient way of providing for multiple outcomes from a set of possible inputs.

The method may further comprise predetermining a plurality of active time periods during control of the video clip player, wherein the processing step is carried out only during the active time periods. These active time periods make data recordal and monitoring more efficient in that not all data received has to be monitored. When the stimulus of a particular scene being displayed is important to determining the path to be taken through the video clips, the monitoring can be turned on. At other places, it can be switched off thereby reducing the amount of data that has to be processed.

The pre-recorded video clips may be sequential in nature and the method may further comprise providing a current position identifier for assisting in non-linear traversal of the sequential pre-recorded video clips.

The using step may comprise using a plurality of sensors to sense EEG signals from the brains of a plurality of observers of the displayed video clip; the transmitting step may comprise transmitting each of the sensed EEG signals from the sensors to the controller; the processing step may comprise processing the plurality of received signals to determine an outcome. In this regard, the processing step may comprise averaging the EEG signals from each of the plurality of sensors for a predetermined frequency or a predetermined combination of frequencies and the outcome may be achieved by an average of the received signals being above a threshold level for a predetermined period of time.

The transmitting step may comprise transmitting a unique identifier of each sensor and the processing step comprises using the unique identifiers to group together signals from predetermined ones of the sensors. Also the using step may comprise grouping together sensors from a geographical area.

In one embodiment the processing step comprises pre-processing the sensed EEG signals and comparing the pre-processed signals with the threshold level. The pre-processing step may also comprise averaging at least some of the plurality of received EEG signals. Also it is possible for the pre-processing step to comprise aggregating together at least some of the plurality of received EEG signals. In this case the aggregating step may comprise aggregating the sensed EEG signals into a plurality of groups, and the comparing step may comprise comparing the pre-processed signals with a plurality of different threshold levels.

The method may further comprise recording the sensed EEG data in a data file over the time period and accessing the recorded data in the pre-processing step. This enables a wealth of historical data to be accessed for more complicated determination of the emotional state of the audience.

The present invention also extends to a control system for controlling the presentation of pre-recorded video clips output to a display; the control system comprising: a video clip player for outputting a series of pre-recorded video clips; a controller for sending a control signal to the video clip player to output a selected pre-recorded video clip to the display; a communications module for receiving EEG signals sensed from the brain of an observer of the displayed video clip; A processor for processing the received EEG signals to determine an outcome, the outcome being achieved by the received signal comprising a predetermined frequency or a predetermined combinations of frequencies of EEG signals above a threshold level for a predetermined period of time; and a data store of a plurality of pre-recorded video clips; wherein the processor is arranged to control the video clip player in response to the determined outcome, the control comprising selecting a next pre-recorded video clip to be output by the video clip player from the plurality of stored pre-recorded video clips and instructing the video clip player to output the selected pre-recorded video clip to the display for presentation to the observer.

The present invention can also be realised as a combination of a control system as described above, a display driven by the control system and at least one EEG sensor for measuring EEG brainwaves of an observer of the display.

The embodiment of the present invention involve a method, system and process of reading brainwave data from single or multiple users obtained through any means of EEG monitoring and recording at certain intervals during the course of a video media file that direct, control or otherwise influence the outcome and/or sequence of scenes within any video media file, such as, for example, but not limited to video, video advertisement or movie file sequences via a multi-platform media player or media device. The content creator of the video media file would decide at which time intervals the EEG brainwave data is to be read, based on the object of the video in question.

In this way, the present embodiments create a novel way to use measured EEG data to determine the outcome or sequence of scenes in a media file based on human emotions and brain activity and in turn influence and alter the user's emotions and brain activity by playing a certain scene or sequence of scenes in accordance with the user's brainwave readings. This it is believed will revolutionise the film making process and the users' experiences, creating a truly interactive media experience. It can also be applied to the fields of psychiatric and therapeutic treatment, advertising and marketing and professional and amateur physical and mental training in order for the users to achieve a desired result by altering their state of mind in response to medical treatment, commercial advertisements and training programmes for physical and mental sports.

The embodiments utilises a single or multiple users' EEG brainwave data to allow viewers to interact specifically with video media by affecting the predefined outcomes of a video sequence or sequences in a video media file through the use of an EEG device, a media player and a text-based computer scripting language file ('text-based file') such as, for example, XML and for the predefined outcomes or sequence of scenes to in turn affect the users' state of mind and brain activity across a variety of professions and industries through the use of video media files created by content creators within the respective field for which the invention is being used.

The monitored EEG data is received via a computer or media player at certain intervals during the course of a video media file. The media player then refers to a text-based file which accompanies the video media file. The text-based file instructs the media player or device to play the appropriate scene in accordance with what the brainwave data reflects.

Although a variety of brain computer interface ('BCI') technology is available, it has never been put to technical use to control, direct, alter or otherwise influence the outcome or sequence of scenes in a video, video advertisement or movie based file or to affect the brain activity of the users themselves.

EEG signals based upon a user's brain activity are used to alter the outcome or sequence of scenes in any media file, such as, for example, but not limited to video, video advertisement or movie file sequences as well as controlling the user's reaction to the balance of the video media file. Ultimately, users will be able to consciously control and alter their own emotive mood and state of mind as they learn that they can choose what sequence of scenes or outcomes to play in a video media file which would in turn impact upon their emotions. It is suitable for use for example; at home, in cinemas, via systems of interconnected computer networks such as the Internet or in any device capable of playing video media files for the purposes of recreation, psychiatric and therapeutic treatment, advertising, marketing and professional and amateur physical and mental training. Doctors and therapists can use this technology to achieve a desired result in their patients' mental condition, for example, to reduce stress levels and anxiety; advertisers can analyse whether users' reactions to the methods they employ in advertising products and services have been positive or negative; and sports trainers can implement this technology on athletes in training regimes in order to encourage and improve their performance levels.

MIME Technology is a software process which forms an embodiment of the present invention.

In some embodiments, a user's brainwave EEG data readings are taken from a dry or wet sensor (wired or non-wired) device while the user is viewing a media file such as, for example a video, video advertisement or movie. The user's brainwave data is based on the user's mental state, which can be expressed as attentive, relaxed, anxious, fearful, hopeful, and so forth. The data is logged and read at pre-programmed intervals. These intervals occur at stages predefined by the creator of the video content, such as film directors, psychiatrists, advertising agencies, professional sports trainers and so forth. The present invention refers the collected data to a text-based file such as, for example, but not limited to XML, which contains instructions on which parts of the data should be read, monitored and interpreted and directions on how it should be translated into changes in the media file. The text-based file, or the 'direction file' is pre-programmed with instructions and directions to play alternative scenes and outcomes for the particular video media file being viewed. Based on the brainwave data, the text-based file directs a media player to play the appropriate scene in the media file according to the brainwave activity and state of mind of the user. It is up to the creator of the video content to decide at which intervals the users' brainwave data should be read and which different time codes (or scenes) of the video media file should be played in line with the emotive and mental states revealed in the readings.

MIME Technology can be applied to both linear and non-linear plot sequence files. In a linear sequence file, MIME Technology uses the data generated from a user's brainwave EEG activity to reach one of a few pre-programmed outcomes in a video, video advertisement or movie file. For example, a user may be viewing a critical football match in a film and may be in a tense state of mind. Using the focus or relaxation algorithms obtained through this user's EEG data, the system of one of the embodiments refers the data of the user's tense state of mind to the text-based file for the direction to play the appropriate scene in accordance with a tense state of mind. The outcome of this particular scene can be that a football player either scores a goal or misses. It is up to the creator of the video content to decide which scene or outcome should be played depending on the user's mental and emotive state. The plot will then continue from this point and this process will be repeated for as many times as the video content creator chooses to do so.

In a non-linear sequence file, MIME Technology allows the user to skip across scenes and time lines. It may contain linear sequences, but has the capability to follow non-linear outcomes.

One embodiment involves the use of a device such as, for example, a headset comprising one or more bio-signal sensors which detect, measure and monitor brainwave EEG data. This data can then be converted to algorithms based on the user's state of mind and brain activity which in turn allow a viewer to directly influence the outcomes or direction of the video media file. An example of how user brainwaves can be measured based on EEG signals detected by sensors is described in more detail in U.S. patent application Ser. No. 11/656,828, filed on 22 Jan. 2007 and entitled "Method and Apparatus for Quantitatively Evaluating Mental States Based on Brain Wave Signal Processing System" which is incorporated herein by reference.

A user's brainwave EEG data is monitored and read by a biofeedback device. The controller of the system can determine how frequently readings are taken and logged and this can be linked to particular scenes of the video media file. The data is read and temporarily logged at particular 'time stamps' in the media file.

In one embodiment, Myndplay is a media player software application, which uses MIME Technology to play interactive media files. Myndplay can be programmed into software operating systems and hardware platforms. A consumer would also be able to purchase and download Myndplay for use on their own hardware platform, such as, for example a personal computer subject to licensing agreements. Myndplay can also be built into other hardware platforms such as, for example, video games consoles, video and DVD players and cinema projectors with the consent of the applicant/inventor. As a media player, Myndplay is capable of receiving algorithms and brainwave EEG data from single or multiple users.

Through the software application of Myndplay, MIME Technology takes the brainwave data and conveys it to a text-based file for direction as to what scene to play on Myndplay in accordance with the user's brainwave reading. The EEG data obtained from the user is translated by proprietary algorithms (which are not the subject of this application) prior to MIME Technology's involvement in the process and these algorithms output signals which can be interpreted by the MIME Technology to determine the user's specific state of mind.

The text-based file directs Myndplay on when to read the user or viewer's EEG signals, for how long to read them and then what the appropriate sequence of scenes in the media file are to be played. The text-based file contains time codes for pre-defined alternative scenes and scenarios which correspond to the user's monitored brain activity.

MIME Technology allows for the media file to be played either directly on Myndplay or on a video display unit, such as, for example, a television set, personal computer, handheld device and cinema screens.

MIME Technology can be used by single or multiple users viewing the same media file. In the case of multiple users, MIME Technology is able to use the collective average of all the users' data to determine the outcome or sequence of scenes in a video, video advertisement or movie file.

The operator can pre-define the ratios, averages and percentages of the multiple users' data to determine what type or level of brainwave activity is required for the text-based file to command a particular outcome or sequence of scenes.

MIME Technology has the capability to use EEG and algorithm data collected and temporarily logged or stored via Myndplay to develop new algorithms and improve existing technology in the fields of scientific research and film and media production.

According to another aspect of the present invention there is provided a method of operating a controller of a device having a visible operation parameter; the method comprising: sending an instruction signal from a connector module to the controller to output a control signal for controlling the visible operation parameter of the device; using a sensor to sense EEG signals from the brain of an observer of the device; transmitting the sensed EEG signals from the sensor to the connector module; processing the received EEG signals to determine an outcome, the outcome being achieved by the received signal comprising a predetermined frequency or a predetermined combinations of frequencies of EEG signals above a threshold level for a predetermined period of time; and manipulating the device controller in response to the determined outcome, the manipulating step comprising: selecting a next pre-determined variation of the operation parameter to be output by the device controller from a plurality of variations; and instructing the device controller to output the selected pre-determined variation of the operation parameter to the device for altering the visible operation of the device to the observer.

The present aspect also extends to a control system for controlling the operation of a device having a visible operation parameter; the system comprising: a device controller for outputting a control signal for controlling the visible operation parameter of the device; a connector system for sending an instruction signal to the device controller to output a selected pre-determined variation to the device; the connector system including: a communications module for receiving EEG signals sensed from the brain of an observer of the visible operation of the device; a processor for processing the received EEG signals to determine an outcome, the outcome being achieved by the received signal comprising a predetermined frequency or a predetermined combinations of frequencies of EEG signals above a threshold level for a predetermined period of time; and wherein the processor is arranged to manipulate the device controller in response to the determined outcome, the manipulation comprising: selecting a next pre-determined variation of the operation parameter to be output by the device controller from a plurality of variations; and instructing the device controller to output the selected pre-determined variation to the device for altering the visible operation of the device to the observer.

BRIEF DESCRIPTIONS OF DRAWINGS

DETAILED DESCRIPTION OF EXEMPLARY EMBODIMENTS

Figure 1:
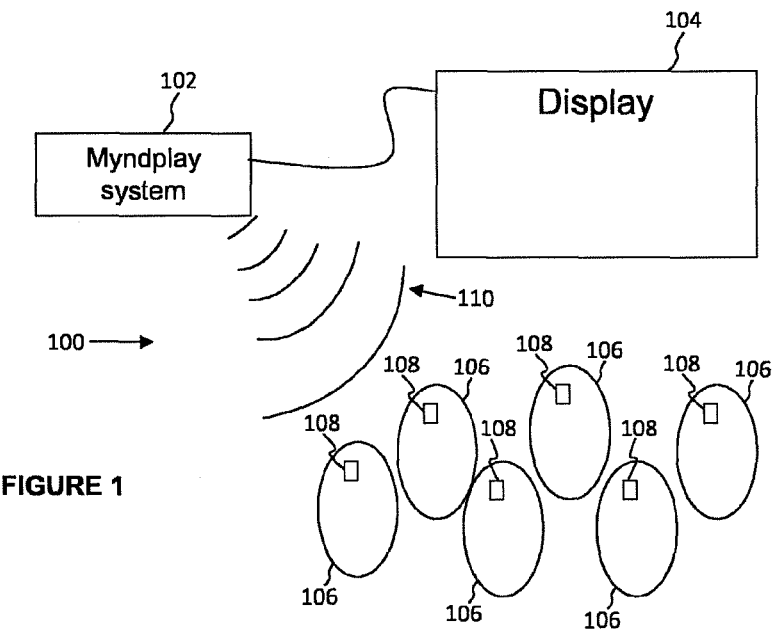
FIG. 1 is a schematic block diagram showing a display controlled by a Myndplay System according to an embodiment of the present invention.

The present invention can be implemented in many ways, including, but not limited to, for example, a software product embodied in a computer readable storage medium and a system of using neuro-signals dependant on human emotions to direct, control or otherwise influence the outcome of a video media file. The outcome and subsequent scenes played in the video media file can also be programmed to be played in order to alter and impact the state of mind of the user.

Conventional mechanisms for altering, directing or otherwise influencing the outcome of a media file based on user preferences are limited to pushing buttons or some other physical interaction. In addition, the EEG user data (algorithms) have not been measured, monitored and collated in a way that would enable advertising agencies and film producers to develop and enhance their advertisements and films to create various alternative scenarios for a truly interactive media experience. The user data can also be applied in scenarios of psychiatric treatment and professional sports training by altering the users' emotions and state of mind by playing certain video scenes based on the users' brainwave readings. For example, psychiatrists and therapists can create video content with scenes showing family members and friends to be played when a patient's brainwave reading reveals that he or she is losing concentration and growing anxious during a session of treatment in order to calm the patient and to continue with the treatment effectively. As another example, in professional sports training, trainers can play video scenes of a rival team being humiliated in defeat when the athlete's brainwave reading indicates that he or she is losing focus or growing fearful of competing with that rival team at an upcoming match.

The present embodiments involve a system, method and process utilising software and hardware to monitor and convey a user's brainwave EEG data to enable single or multiple users to interact with and essentially alter and direct the outcome and sequence of scenes in a media file, such as, for example video, video advertisement or movie file.

In operation, a user may be connected to a dry or wet sensor (wired or non-wired) EEG device whilst viewing a media file played through Myndplay. At pre-programmed stages, MIME Technology reads the user's brainwave data and interprets the user's state of mind. Through the media player/process, Myndplay, MIME Technology refers the user's data to a text-based 'direction file' which directs Myndplay to jump to a particular scene or time code in the video media file dependent upon the user's brain activity. Myndplay then plays the commanded scene or sequence of scenes. In turn, the video scene or sequence of scenes played as a result of the users' brainwave readings can directly impact the users' state of mind and emotions to achieve a desired result.

The alternative outcomes and sequences of scenes of the media file can be developed by (and this is not limited to) film producers, studio and movie directors, advertising agencies, marketing companies, professional sports trainers and doctors.

For the user, no physical steps are involved other than placing a dry or wet sensor (wired or non-wired) EEG device on his or her head or any part of the human anatomy capable of monitoring and collecting EEG data.

In one non-limiting embodiment, a method is provided comprising: receiving information contained in algorithms (already derived from a device that monitors/collects/interprets EEG data) associated with a single or multiple users' brainwave activity; using the data as a means to select particular scenes to allow the user to direct the outcome or sequence of scenes in a video, video advertisement or movie file; referring the data to a text based computer scripting language file, such as, for example, but not limited to, XML as a means to direct a media player or device to skip to particular scenes or time codes in a media file; using the collective average of multiple users as a means to determine the outcome or a sequence of scenes in a media file; presenting the media file to a user(s) on a display unit, including, but not limited to, a television set, personal computer, handheld device and cinema screen.

The producers, directors and creators of a media file may use the obtained EEG data as a means of developing interactivity, improving and enhancing films, videos or video advertisements.

The user of the software process may determine the outcome of a particular scenario or entire plot of a video, video advertisement or movie file on a visual display unit, cinema or other projector screen, whether directly or through a third party media provider using their mind through data as received from an EEG feedback device.

The user's data as contained in the EEG feedback may be logged and temporarily stored for purposes such as, for example, film and advertisement direction and production.

The user's data as contained in the EEG feedback may be logged and temporarily stored for purposes such as, for example, developing new algorithms, improving and enhancing MIME Technology and Myndplay to enhance the user's experience.

In another non-limiting embodiment a process is described comprising software technology that transmits a single or multiple users' EEG data from a dry or wet sensor (wired or non-wired) EEG device to a media player which then refers to a text-based computer scripting language file which in turn directs the media player to allow users to control, or otherwise influence the outcome and/or sequence of scenes in a media file.

The media player/process may itself play, display or otherwise project a media file or process. The media player/process may be compatible with any other hardware device, such as, for example, a visual display unit, cinema or other projector screen, whether directly or through a third party media provider, to play, display or otherwise project a media file.

The media player such as Myndplay is preferably capable of receiving EEG and EEG algorithm data from a single or multiple users.

In another embodiment, a system comprising: transmission of algorithms derived from brainwave EEG data to any video player or media device; use of a text-based computer scripting language file as a means to direct a media player to skip to particular scenes or time codes in a media file; use of the collective average of multiple users' brainwave algorithm data as a means to determine the outcome or sequence of scenes in a media file; presentation and display of an interactive media file to a user or multiple users via a display unit.

The brainwave EEG data may be logged and temporarily stored and used as a means to develop new algorithms and improve existing technology in the fields of scientific research and film and media production.

The brainwave EEG data may be logged and temporarily stored and used as a means to improve and enhance MIME Technology and Myndplay to enhance the user's experience.

The embodiments described herein are directed to a method, system and apparatus for using and acting upon brainwave electro-encephalographic data from any sensor to direct or influence the outcome of any media file including but not limited to video, video advertisement or movie file sequences via a media player and for the outcome of the video sequence to, in turn, direct and alter the emotions and state of mind of the users. It uses algorithm data based upon the brainwave readings and conveys them to a media player which refers to a text-based computer-scripting language file to direct the outcome or sequence of scenes in a media file playable through various platforms, including but not limited to personal computers, television, Digital Video Disc, cinema screens, handheld devices and video consoles. The computer-scripting file uses pre-defined alternative outcomes in accordance with the user's state of mind as measured by the EEG device and directs the player to play the appropriate scene or time code within a video, video advertisement or movie file, thus enabling a user to influence the progress/outcome of a file.

Referring to FIG. 1, there is shown an environment 100 in which an embodiment of the present invention (herein after referred to as the Myndplay System 102) operates. The Myndplay System 102 in this embodiment drives a visual display 104 such as a monitor, television, projection screen etc to output content. The display 104 is observed by one or more subjects 106 (six are shown in the figure). Each subject 106 has fitted to their head an EEG sensor 108 which monitors neural activity being generated by the subject's brain as a result of observing the display. Each sensor has a wireless transmitter for sending the outputs 110 of the sensor to the Myndplay System 102 where the data is processed to determine how to drive the output to the display 104.

Each sensor 108 preferably comprises a Bluetooth transmitter as it has a low-power consumption profile and transmits a unique identifier so that when multiple EEG sensors 108 are transmitting their data to the Myndplay System 102, each sensor 108 can be distinguished. Also the Myndplay System 102 has a corresponding Bluetooth receiver for receiving the EEG data. However, other forms of wireless protocol transmitters and receivers can be used, and in some different embodiments the connection between the sensors 108 can be wired.

The technology employed in recording the subject's neural activity is known and is not the subject of this application.

Figure 2:
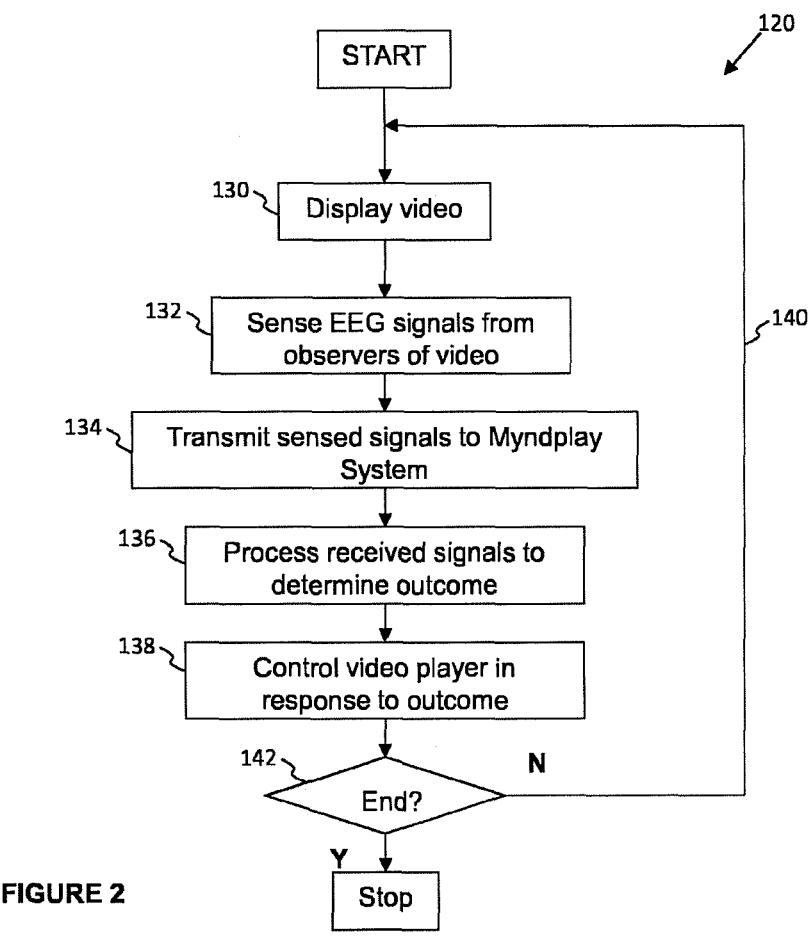
FIG. 2 is a flow diagram showing the overall operation of the Myndplay System in controlling the display of FIG. 1.

Referring to FIG. 2, the overall operation 120 of the system is now described. The operation commences with a display at Step 130 of a video clip or video fragment/segment 173 (see FIG. 3) on the display 104. The fragment is a pre-recorded video fragment which has been selected from a plurality of pre-recorded fragments of video. The audience of subjects 106 views the display 104 and this causes a reaction to the displayed content in their minds. This reaction comprises the emitting of various different brainwaves which are sensed electrically by EEG sensors 108. However, this is not to be confused with an evoked potential technique which is not the subject of the present invention. The sensors 108 also monitor a subject's efforts to control their own mental state such as how relaxed they are or how focussed they are, and this is in turn captured in the brain activity which is recorded.

The EEG signals are sensed and processed at Step 132 in a known manner in the sensors and the resultant outputs are then transmitted at Step 134 to the Myndplay System 102. Here each received signal is processed at Step 136 by the system to determine an outcome. The signal may be combined from different subjects to result in averaged values for a group of subjects. However, for the purposes of the following description, only the signal received from a single subject is described, though clearly the present embodiment extends to processing a plurality of such signals.

On determination of the outcome of the signals received, the Myndplay System 102 controls at Step 138 the video fragment playback and selects which fragment to output to the display next. This is carried out seamlessly such that the video appears to the subjects viewing the video to be a single continuous pre-recorded video. In order to facilitate this smooth transition, as with conventional films where there is a change of scene, the present output can be faded to black at the end of some fragments (where scene change context permits) and faded in from black at the beginning of the following fragment.

The process then is repeated at Step 140 until the end of the video to be displayed is reached as determined at Step 142.

Figure 3:
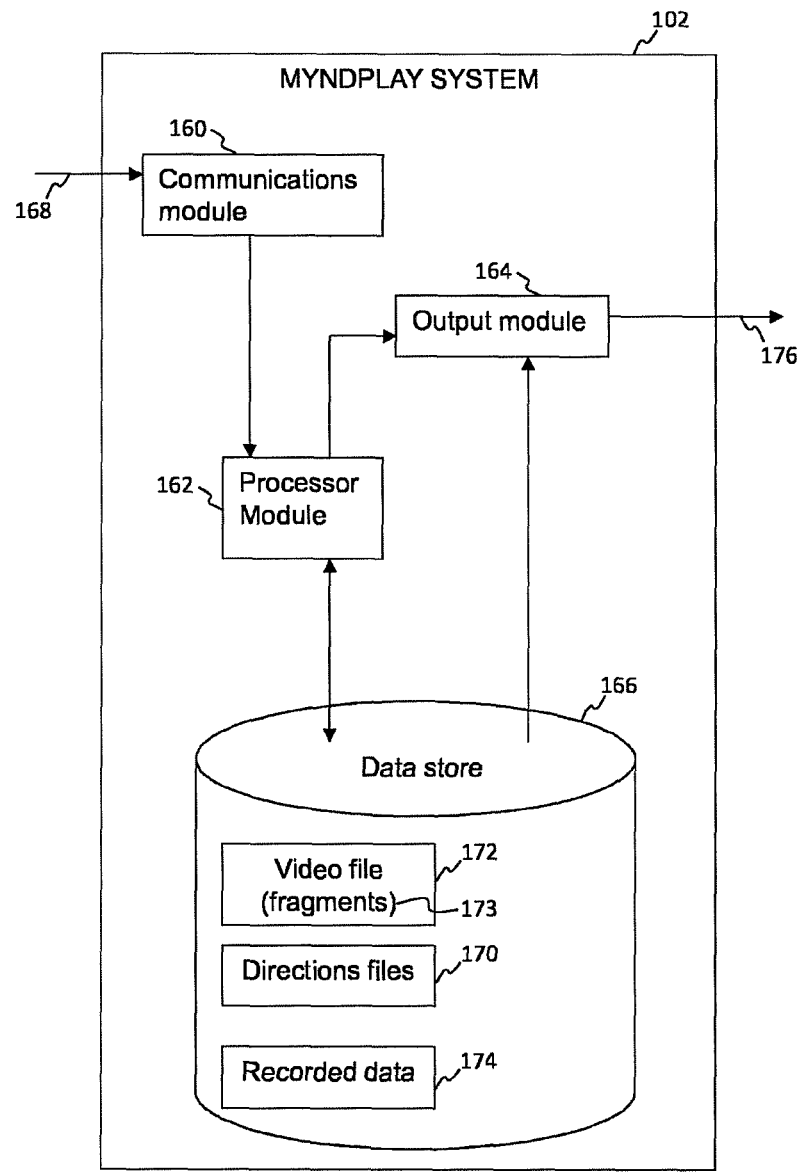
FIG. 3 is a schematic block diagram showing the components of the Myndplay System shown in FIG. 1.

The Myndplay System 102 comprises four key components which are illustrated in FIG. 3, namely a communications module 160, a processor module 162, an output module 164 and a data store 166. The communications module 160 interfaces with the incoming data streams 168 from the subject sensors 108 and forwards the received data for each sensor to the processor module 162. The communications module 160 is responsible for maintaining connections with the sensors 108 and if there is a break in communications it sends the appropriate notification to the processor module 162. This is described in greater detail later with reference to FIG. 7.

The processor module 162 is configured by one of a plurality of directions files 170 stored within the data store 166 which tells it how to process the incoming data signals from the given sensors 108 and what action to take as a consequence of that processing. This is the primary function of the processor module 162. The processor module 162 of this embodiment determines what is to be the next pre-recorded video fragment 173 to be played back to the subjects 106 viewing the display 104. This selection can be sent to the output module 164 so that the next video fragment 173 can be obtained directly from the data store 166.

The data store 166 stores a data file 172 containing many pre-recorded video fragments 173 which form the video to be output to the display 104. The particular combination of fragments 173 to be output is determined by the processor module's processing of the incoming data 168. The data store 166 provides data files 172 to the processor module 162 and directly to the output module. The directions files 170 are also held in the data store 166.

The data store 166 also stores recorded data 174 which represents data values of parameters such as 'focus' and 'relaxation' (recorded from the sensors 108) which may need to be averaged over a time period to determine an outcome by the processor module 162. The stored recorded data 174 not only comprises received sensor data 168 but also new parameters (such as a Zone parameter—described later) created by the processor module 162 in performing its analysis. This data is useful in that it enables the processor module 162 to carry out data analysis by comparison with historical parameter values for that subject or group of subjects 106.

Whilst not shown in the figures, each directions file 170 contains a sequential series of scenes (video fragments 173 to be output) followed by an outcome (defined as an action) which is to be taken as a result of analysis on data 168 received from the sensors 108. The outcome may specify any analysis to be carried out on the incoming data as well as the time period over which the data is to be sensed. For example, the outcome may specify a 10-second window from time T1 and a threshold value of 50 units for parameter A. If the incoming sensed data 168 considered over this time period reaches a value of 50 units then the action specified in that outcome will be taken. Alternatively, if the value does not reach 50 units during the time period, a default action (which assigned to each outcome) will be taken. This typically equates to the selection of the next video fragment 173 to be played by the output module 164. Other functions can be used such as averaging a parameter over the specified period of data analysis and determining if this is above a threshold. Also data from several different sources (subjects' sensors) can be aggregated and the aggregated value compared to a predetermined threshold. Typically, the directions files 170 are encoded in XML and the processor module 162 executes the XML to effect its action selection function.

The output module 164 outputs a selected series of video fragments 173 (an output 176) which have been determined by the processor module 162 and which are retrieved directly from the data store 166. The output module 164 interfaces this output 176 to the requirements of the display 104 which it is driving. For example, the output 176 may be a composite video signal.

Figure 4:
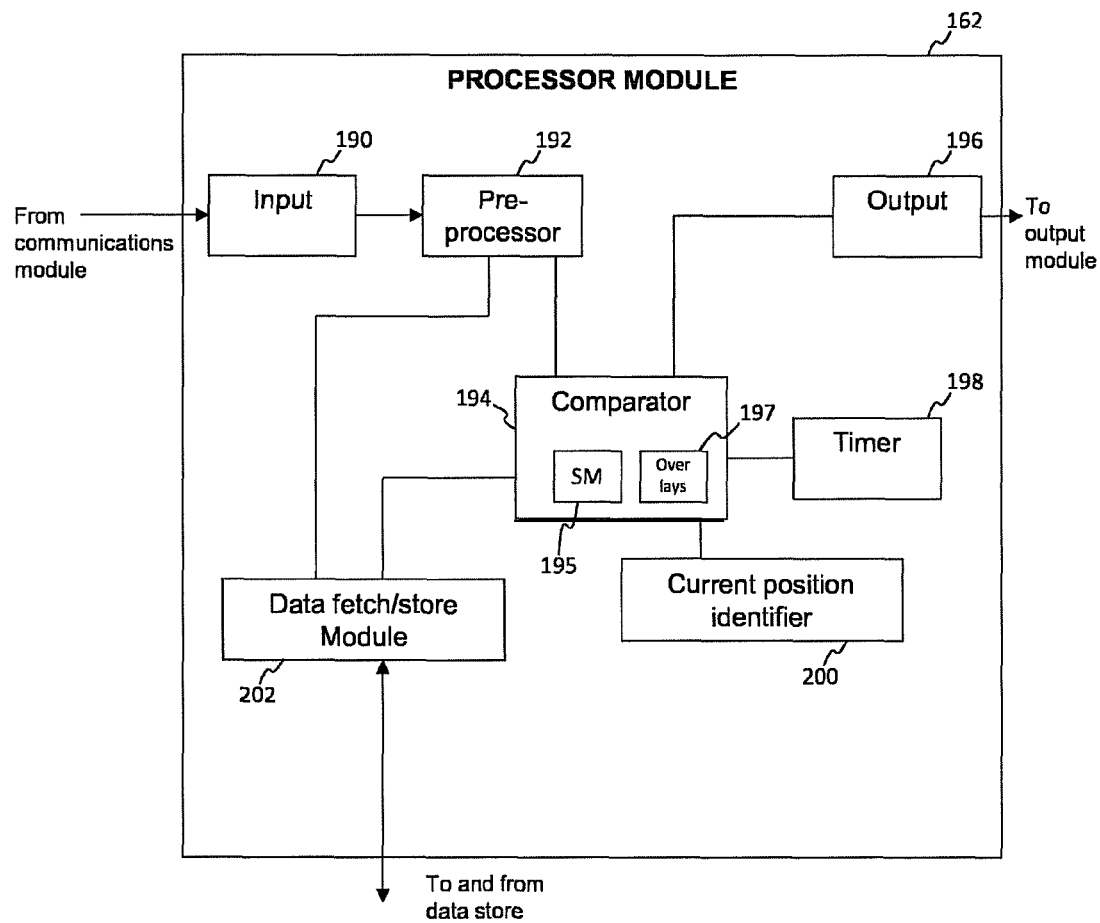
FIG. 4 is a schematic block diagram showing the components of the processor module shown in FIG. 3.

Looking now more closely at the structure of the processor module 162, it can be seen in FIG. 4 that the processor module 162 comprises an input 190 for connecting to the communications module 160, a pre-processor 192 for carrying out any processing of input 190 prior to providing input data to a comparator 194 and an output 196 (for coupling with the output module 164). The comparator 194 receives data from the pre-processor 192 and sends results to the output 196. The comparator 194 accesses a timer 198, a current position identifier 200 (pointer) and a data fetch/store module 202 which provides the interface to the data store 166.

More specifically, data received by the input 190 is sent to the pre-processor 192 which can either simply pass the data unchanged onto the comparator 194 or carry out some form of pre-processing before passing on the data. The pre-processor 192 for example may average the incoming parameter values to derive processed parameter (in this case an averaged value of the raw parameter data). Also, when data from multiple subjects 106 is being received, the pre-processor 192 can create groups of subjects according to predefined criteria, such as subject location within an area (called 'zoning'), or predefined teams to which subgroups of the subjects belong. In this case, a new aggregated parameter is created which combines the data values of the parameter from the subjects in the group. The pre-processor 192 processes data in order to reduce the real-time processing burden on the comparator 194.

The pre-processor 192 can also be used to create other parameters not received from the remote sensor 108. This is because the remote sensor 108 outputs raw data as well as the parameters which are described as used by the system (focus and relaxation parameters). The raw data includes an overall composite brainwave signal, as well as the filtered out brain signals such as Alpha waves (8-13 Hz), Beta waves (13-38 Hz), Theta waves (4-7 Hz), Delta waves (below 4 Hz), Gamma waves (39-100 Hz), and SMR (Sensor Motor Rhythm waves—around 14 Hz). This raw data enables new parameters to be determined by the pre-processor 192 such as blink detection—described later. This raw data and the determined new parameters are also sent to the data fetch/store module 202 for storage in the data store 166.

The primary function of the comparator 194 is to carry out data analysis and determine what to do under which conditions. The comparator 194 is provided with all of the parameters relating to the subject's state of mind from the pre-processor 192. These input parameters are put into a predetermined state machine 195 which enables different parameter combinations and values to be set that determine a given outcome. The state machine 195 holds all of the possible outcomes such that for any given input of parameters, the state machine 195 carries out data analysis to determine the outcome (typically which video fragment 173 will be selected to be output next).

During the playback of a series of video fragments 173, there are different time periods which define whether or not the incoming data from the sensors 108 is to be used. In order for the comparator 194 to determine whether to use the incoming data or not, the timer 198 and the current position indicator 200 are provided. The timer 198 provides the comparator 194 with the time period since an event occurred and the current position identifier 200 provides a pointer to the current location in the directions file 170. The directions file 170 may determine that at time $T_1$ the received sensor data is to be read to carry out data analysis and this is to stop at time $T_2$. Time $T_1$ and $T_2$ are determined by use of the timer 198 which is run from the beginning of the output of the first scene. This can be repeated several times within the directions file 170 to determine several time periods when the subject's sensory data is to be used to actively determine how the system is to react.

The comparator 194 also updates the current position identifier 200 as it proceeds along the directions file 170. The reason for having a position identifier 200 is that traversing the directions file 170 is usually non-linear as it is driven by outcomes of each data analysis carried out by the state machine 195. In addition, the data which is analysed may also be sent to the data fetch/store module 202 so that it can be stored in the data store 166. Also data may be retrieved from the data store 166 to enable the comparator 194 to carry out its analysis. This is particularly the case when the current data analysis needs to access recorded data 174 (which may represent historical information) to determine an outcome, for example the value of the focus parameter at the start of the timing period and its average value in the previous data sensing period.

The comparator 194, thus on the basis of the data analysis (carried out via the state machine 195), determines which video fragment 173 is to be displayed next. This information is sent to the output 196 such that it can then instruct the output module 164 to retrieve the video fragment 173 and output it to the display 104.

The comparator 194 also can determine if an overlay of graphical information 197 is also required to be output. Some examples of the types of graphical information which can be output are described later with reference to FIGS. 11a and 11b. However, this information is useful in that it provides direct feedback to the subjects of the current values of the emotional parameter which is currently being measured by the comparator 194. Typically, this is shown in the form of a meter (the dial of a meter). This feature is very useful in the current case where the outcomes determine whether or not to play a video fragment 173, which is in effect a binary decision. When this is determined by measurement over a time period, the subject is not otherwise aware of how close they are to the threshold and so this continuous value feedback enables them to see in real-time the effects of them trying to control the output of their brain.

Figure 5:
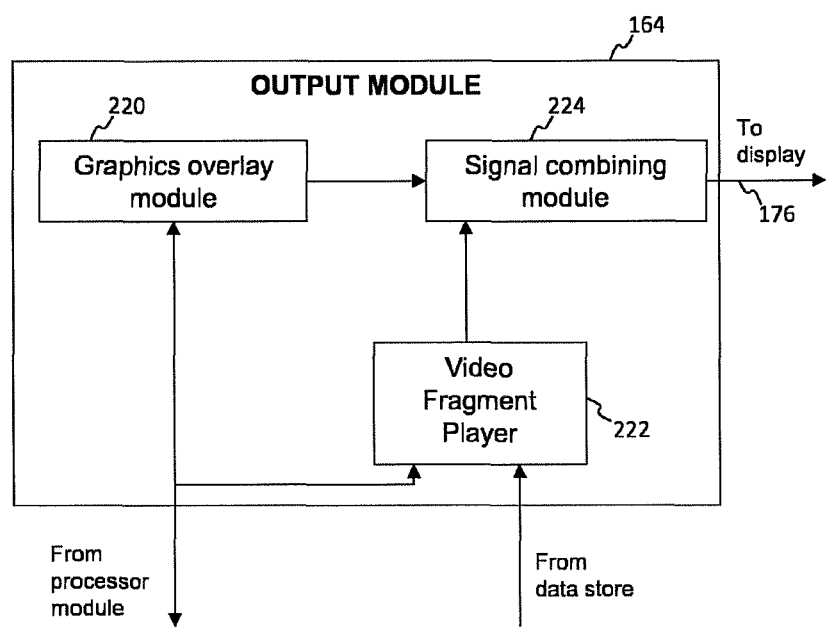
FIG. 5 is a schematic block diagram showing the components of the output module shown in FIG. 4.

Referring now to FIG. 5, the components which make up the output module 164 are now described. The output module 164 comprises a graphics overlay module 220 for creating a computer-generated graphical overlay 197, a video fragment player 222 for playing back a video fragment 173 and a signal-combining module 224, which takes the outputs of the graphics overlay module 220 and the video fragment player 222 and outputs a composite video signal 176 overlaid with graphics 197.

When the comparator 194 of the processor module 162 determines that a graphical overlay 197 is required to provide feedback of sensed and calculated parameters to the subjects 106 via the display 104, a signal is sent to the graphics overlay module 220 to generate the graphical overlay and to show the value of the specific parameter to which it relates. The graphics overlay module 220 then retrieves the overlay 197 from the comparator 194 of the processor module 162 and generates this graphic (overlay which shows the value of the parameter being displayed) and sends it to the signal combining module 224.

At the same time, the comparator 194 chooses a particular video fragment 173 which needs to be played back to the subjects 106 via the display 104. This selection is sent by the processor module 162 to the video fragment player 222 which retrieves the fragment 173 from the video file 172 stored in the data store 166 and outputs that fragment 173 to the signal combining module 224 (by playing it).

The signal combining module 224 combines the graphical overlay 197 with the video fragment 173 being played to generate the composite output signal 176 which is sent to the display 104. As the graphical overlay 197 typically represents a real-time signal, the graphic 197 is continually changing as the video fragment 173 is being played. The output thus also has both the video fragment 173 and the overlay changing in real time. Typically, the overlay 197 only occupies a relatively small part of the area of the display 104 (see examples in FIGS. 10, 12 and 13a) as it is not intended to detract from the video fragment 173 being played back to the subject.

This feedback (in the form of the graphical overlay 197), particularly when in the form of a dial of a meter, such as a focussing meter, is a convenient and powerful method of providing a subject feedback of their emotional state.

Figure 6:
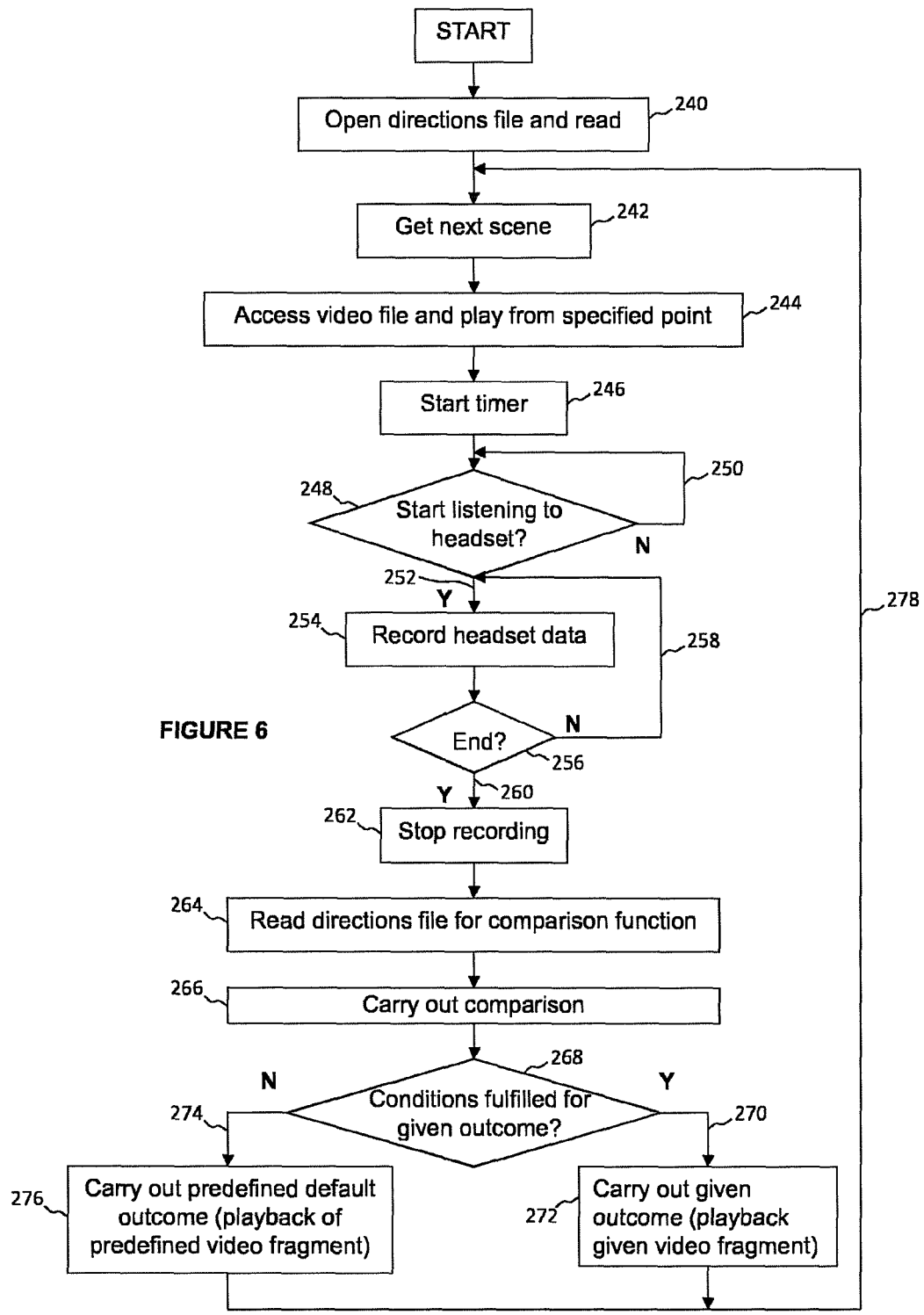
FIG. 6 is a flow diagram showing the detailed operation of the processor module of the Myndplay System of FIG. 1.

The operation of the processor module 162 is shown in FIG. 6. The operation commences with the comparator 194 retrieving and reading at Step 240 the directions file 170 to determine what video fragment 173 to be displayed. The instructions specify which scene is to be retrieved 242 next for display and this is communicated at Step 242 to the output module 164 which gets the next scene. The video fragment player 222 then accesses at Step 244 the video file 172 stored in the data store 166 and retrieves the specified fragment 173, namely starts playback at Step 244 from a specified point. At this time, the timer 198 is activated at Step 246 to keep track of the duration of playback. The timer 198 is important as it determines when the next events are to occur. The scenes keep being played back by this method. During this time, the processor module 162 is checking at Step 248 for a point when the directions file 170 indicates that data from the remote sensors 108 is to be recorded. So long as no data has to be recorded, playback continues and the method keeps checking at Step 250. Once this point has been reached at Step 252, the data from the sensors 108 (also referred to as headsets) is recorded at Step 254 into the recorded data file 174 of the data store 166. The directions file 170 also indicates at what point recordal of the sensor data 168 is to be stopped (the start/stop times between them defining the sensor data recordal period). The processor module 162 then checks at Step 256 whether this point has been reached. If not then it keeps recording at Step 258 the sensed data 168. However, once this point has been reached at Step 260, the recording of data into the recorded data file 174 is stopped at Step 262.

The processor module 162 then reads at Step 264 the directions file 170 to understand what form of analysis is to be carried out. Typically, this takes the form of a comparison function. The comparison is then carried out at Step 266 comparing sensed parameter values (or of parameters derived therefrom) and comparing these to predetermined thresholds stored in the directions file (implemented as a state machine 195). The result of the analysis (comparison) is then considered at Step 268 and if the conditions have been fulfilled at Step 270 for a given outcome, then that given outcome is carried out at Step 272. This is typically the selection of a given video fragment 173 for playback on the display. If on the other hand, the conditions have not been fulfilled at Step 274 for a given outcome, then a predefined default outcome is carried out at Step 276. This is typically the selection and playback of the default video fragment 173. The whole process is then repeated at Step 278 for the next instruction in the directions file 170.

Figure 7:
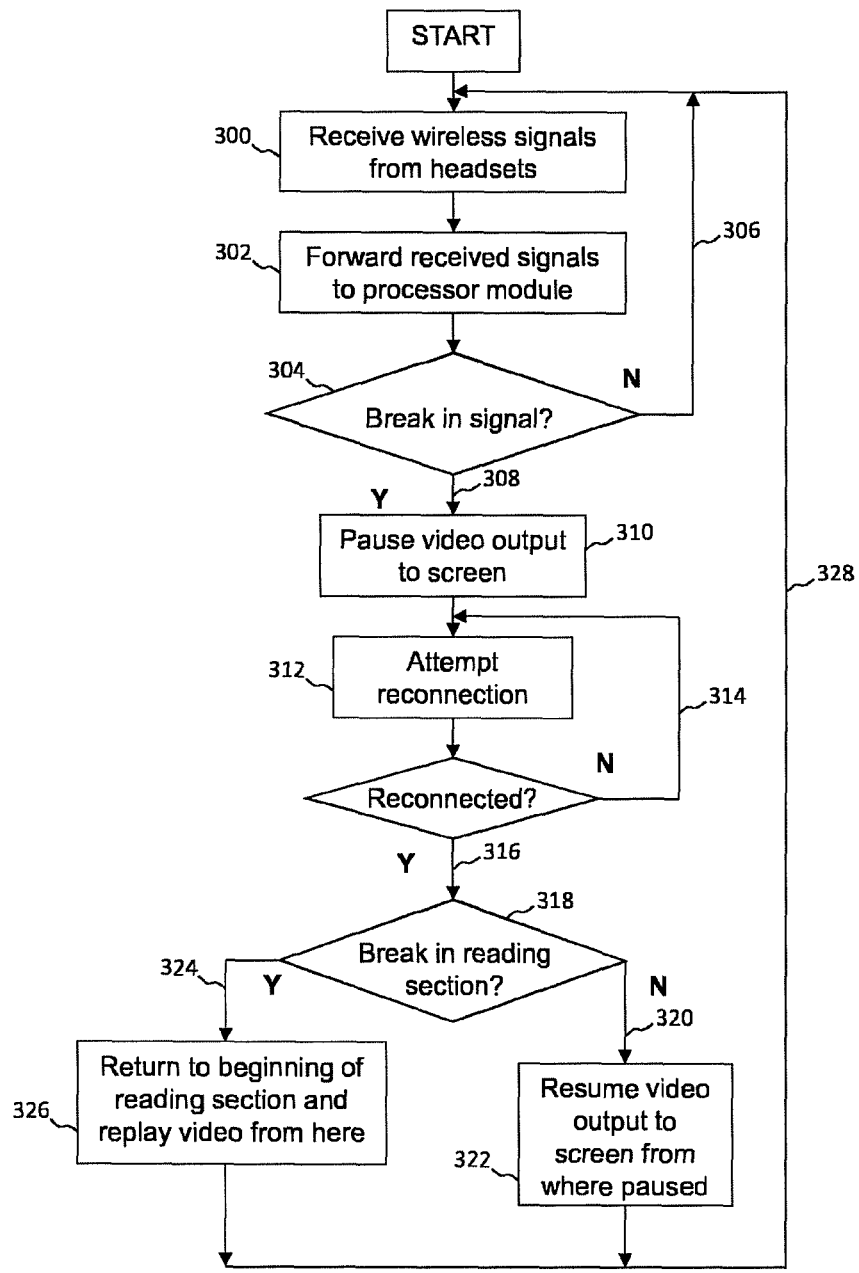
FIG. 7 is a flow diagram showing the detailed operation of the communications module and the processor module of the Myndplay System of FIG. 1 when wireless handling communications break between the headsets and the Myndplay System.

The operation of the communications module 160 and the processor module 162 for dealing with a drop out of signal reception from the subject's headset(s) is now described with reference to FIG. 7. The operation commences with the receipt at Step 300 of wireless signals (including sensor data) 168 from the plurality of sensors 108 worn by the subjects 106. These signals are in the normal course of operation simply forwarded at Step 302 to the processor module 162 for pre-processing and recording. However, a check at Step 304 is also carried out to see if a break in signal is detected. If not at Step 306 then the process continues with the sensing at Step 300 and subsequent forwarding at Step 302 of further signals. However, if there is a break in the signal as detected at Step 308, then a stop signal is sent to the processor module 162. On receipt of this stop signal, the processor module 162 sends a signal at Step 310 to the output module 164 to pause the playback of video fragments 173. Also if the processor module 162 happens to be in a sensor recording period where data is being recorded for use in determining an outcome, then the recording of the received sensor data is stopped (not shown).

The communications module 160 at this point in time attempts at Step 312 to reconnect with the remote sensors 108. If reconnection is not successful at Step 314, then further attempts at reconnection at Step 312 are carried out until successful. When the reconnection is successful at Step 316 as determined by the communications module 160, a check at Step 318 is made to determine if the location of current position identifier is in a sensor recording period or not. If not at Step 320 then the video is resumed at Step 322 from where it was paused. However, if the break was during a sensor data recording period as determined at Step 324, then the recording is recommenced and the output video fragment 173 is replayed at Step 326 from the beginning of the period from which the sensor data recording began. The process then continues at Step 328 from the sensing and forwarding steps 300 and 302 mentioned above. In this way, distortions of the recorded sensor data are avoided and the disruption to the playback output on the display is also minimised.

Figure 8:
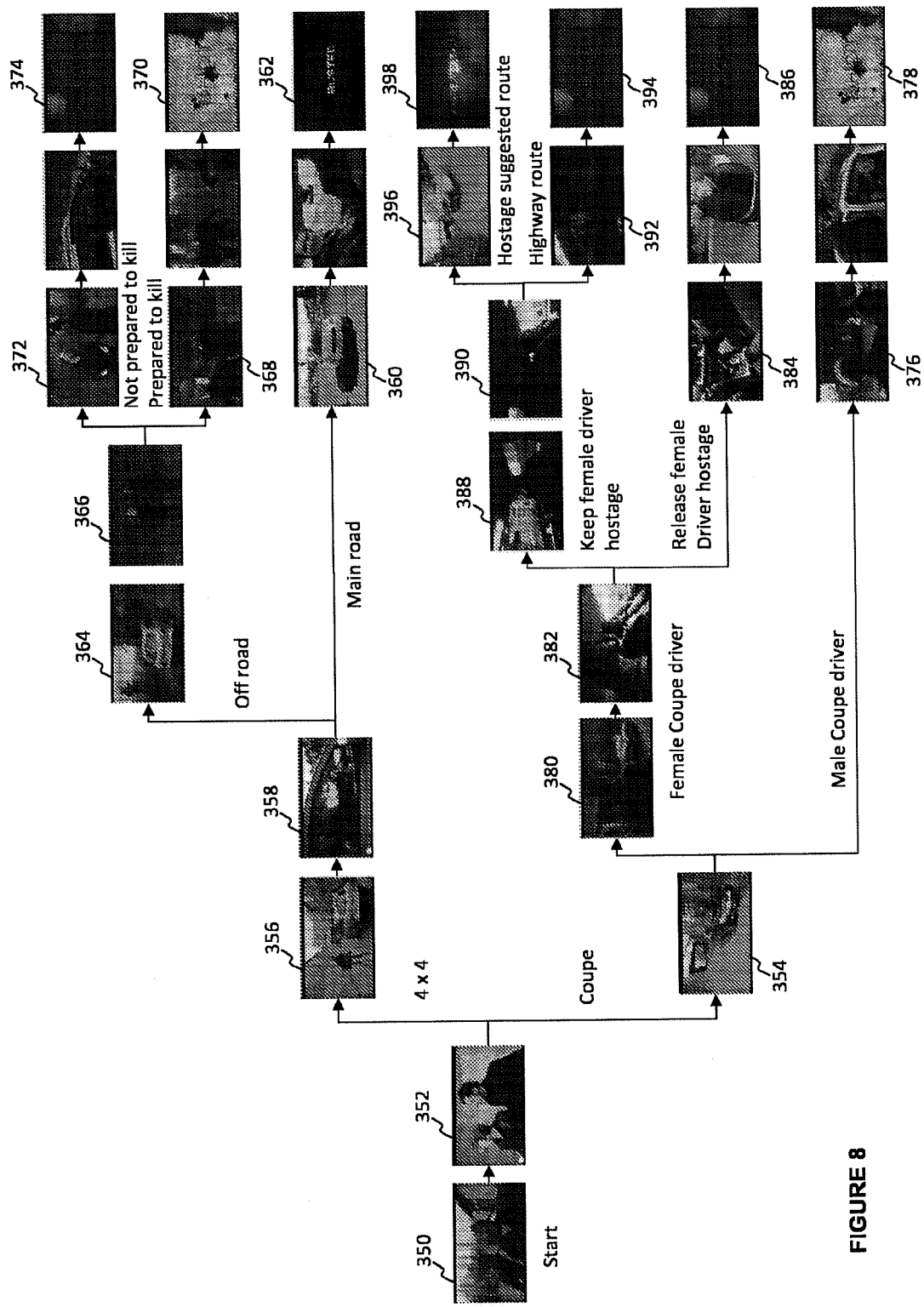
FIG. 8 is a schematic diagram of a series of scenes and decision points showing a relatively simple example of a subject interaction with the Myndplay System of FIG. 1.

FIG. 8 is a schematic representation of an example of the output created by execution of a directions file 170. This figure also reflects the contents of the corresponding directions file 170. The output starts by displaying a scene 350 (each rectangular image represents a scene (video fragment 173) to be displayed). Scenes 350 are displayed sequentially until a first decision scene 352 where a decision needs to be made. At this first decision scene 352, the decision is made what type of car to be stolen (4×4 car or coupe). If the decision (based on the data analysis of the sensor data received from the subject's brain) indicates that the coupe is preferable, then scene 354 is selected and played back to the viewing subject 106. Otherwise, the default scene 356 is played back following the first decision scene 352 and represents the stealing of a 4×4 car.

Assuming that the 4×4 car route has been selected, a second decision scene 358 is to then to determine whether to take the car 'off road' or on the 'main road'. If the 'main road' option is selected as a result of data analysis on the sensor data 168 received from the subject's brain, then main road scene 360 is played back on the display 104 and a resultant end node 362 of 'BUSIED' is reached ending the playback of any further video clips 173. This also indicates failure in this mind-controlled task. However, if the result of the sensor data analysis is an 'off road' option, then off road scene 364 is displayed and a third decision scene 366 is reached.

At the third decision scene 366, the subjects 106 have to decide whether they are prepared to kill to escape or not. If they are prepared to kill (as determined by analysis on the sensor data), then scene 368 is played back resulting in the unfortunate shooting of both escapees and ending in a resultant 'shot' end node 370. Clearly this is a failure of the two escapees to escape. If however, the decision is that they are not prepared to kill to escape, then a not prepared to kill scene 372 is played back on the display 104. This results in an end 'Car jacked' node 374 where the escapees are carjacked by a stranger and hence the task ends in failure as they have no transport.

Going back to the first decision scene 352, if the decision as determined by analysis on sensor data is to steal a coupe and a steal coupe scene 354 (which is a fourth decision scene) has been played back, the decision of whether to steal a coupe from a woman or man is determined. Based on the analysis of received sensor data 168, if the decision is to steal a coupe from a man, male scene 376 is played back. This results in failure of the escape as both escapees are shot as shown by end node 378.

If, however, the decision based on analysis of received sensor data 168 is to steal a coupe from a woman, female scene 380 is played back until a fifth next decision scene 382 is reached. Here the received sensor data 168 determines whether to keep or lose the woman hostage. If the decision is to lose the woman hostage, then Scene 384 is played back to the display. This results in failure of the escape as both escapees are car jacked and they have no further means for escape, node 386. Alternatively, if the woman hostage is kept, then scene 388 is played back until a sixth decision scene 390 is reached.

At the sixth decision scene 390, a decision is made based on analysis of the received subject data 168 of whether to proceed via the route suggested by the woman hostage or to proceed via the highway. If the highway route is selected, then scene 392 is played back. This results in end node 394 and failure of the escape as both escapees are 'car jacked' and they have no further means for escape.

If however, the decision at the sixth decision scene 390 is to go her way (as determined by the analysis of the received sensor data 168) then the scene 396 is played back. This results in the successful outcome end node 398 of the escapees succeeding in completing the great escape.

Figure 9:
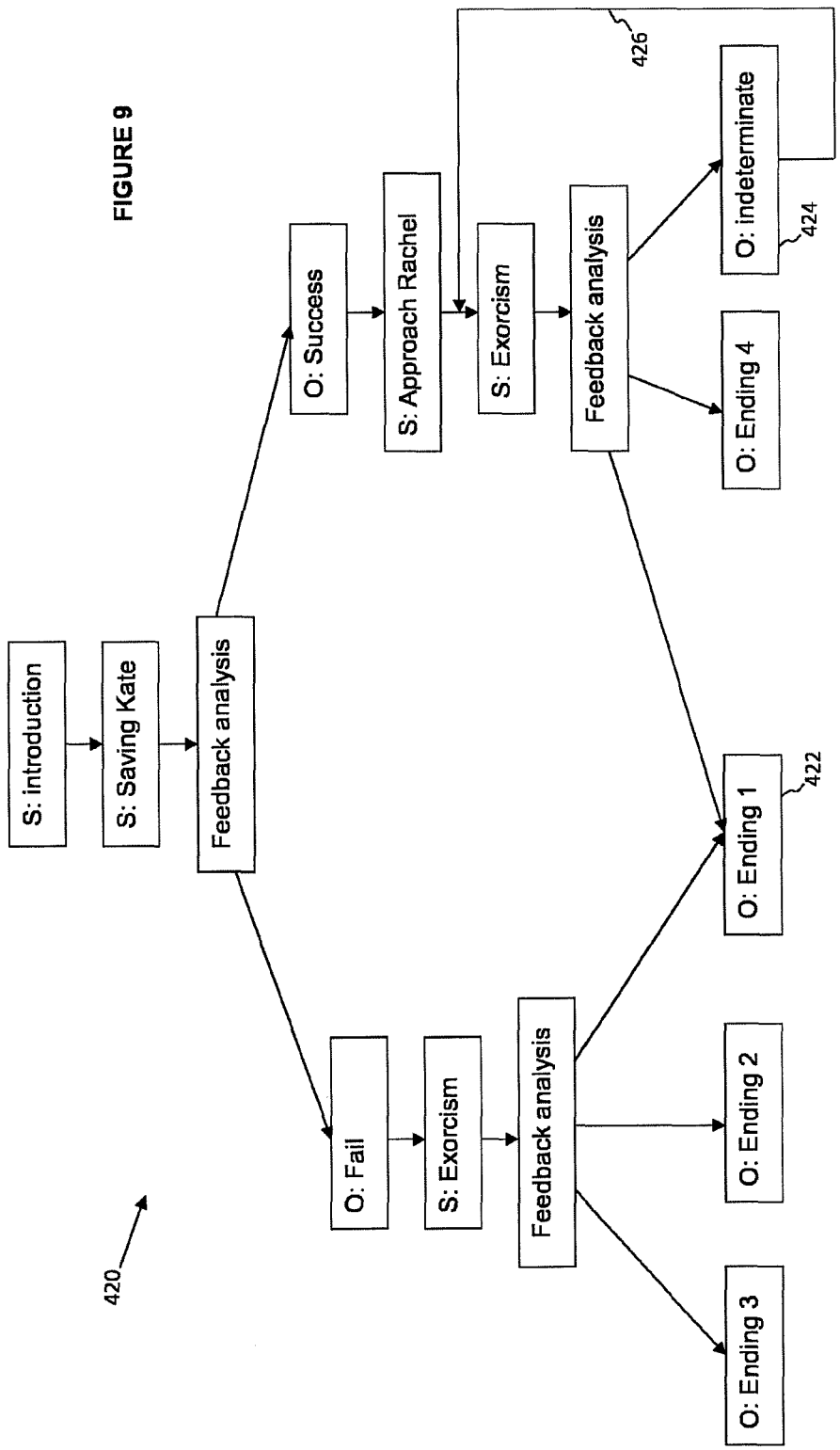
FIG. 9 is a schematic block diagram of a series of scenes and outcomes showing a complex example of a subject interaction with the Myndplay System of FIG. 1.

FIG. 9 shows a further example of the contents of a directions file 170. This example involves the storyline of an exorcism more complex than the great escape example described in FIG. 8. The scenes and outcomes are provided in the form of a hierarchical traversal tree 420. There are scenes which are played and when an outcome is arrived at, feedback data analysis occurs to determine which of the possible outcome results will be followed. The example is relatively simple to follow but shows how multiple different branches of the traversal tree can lead back to the same outcome (e.g. Outcome 1, at Step 422). Also it shows how where a result of the analysis in inconclusive at Step 424, for example that the result of the analysis provides an equal answer, then it is possible to require the analysis to be carried out again at Step 426 in the hope of a different result. Also, this complex example shows how there can be more than two results from an analysis.

Figure 10:
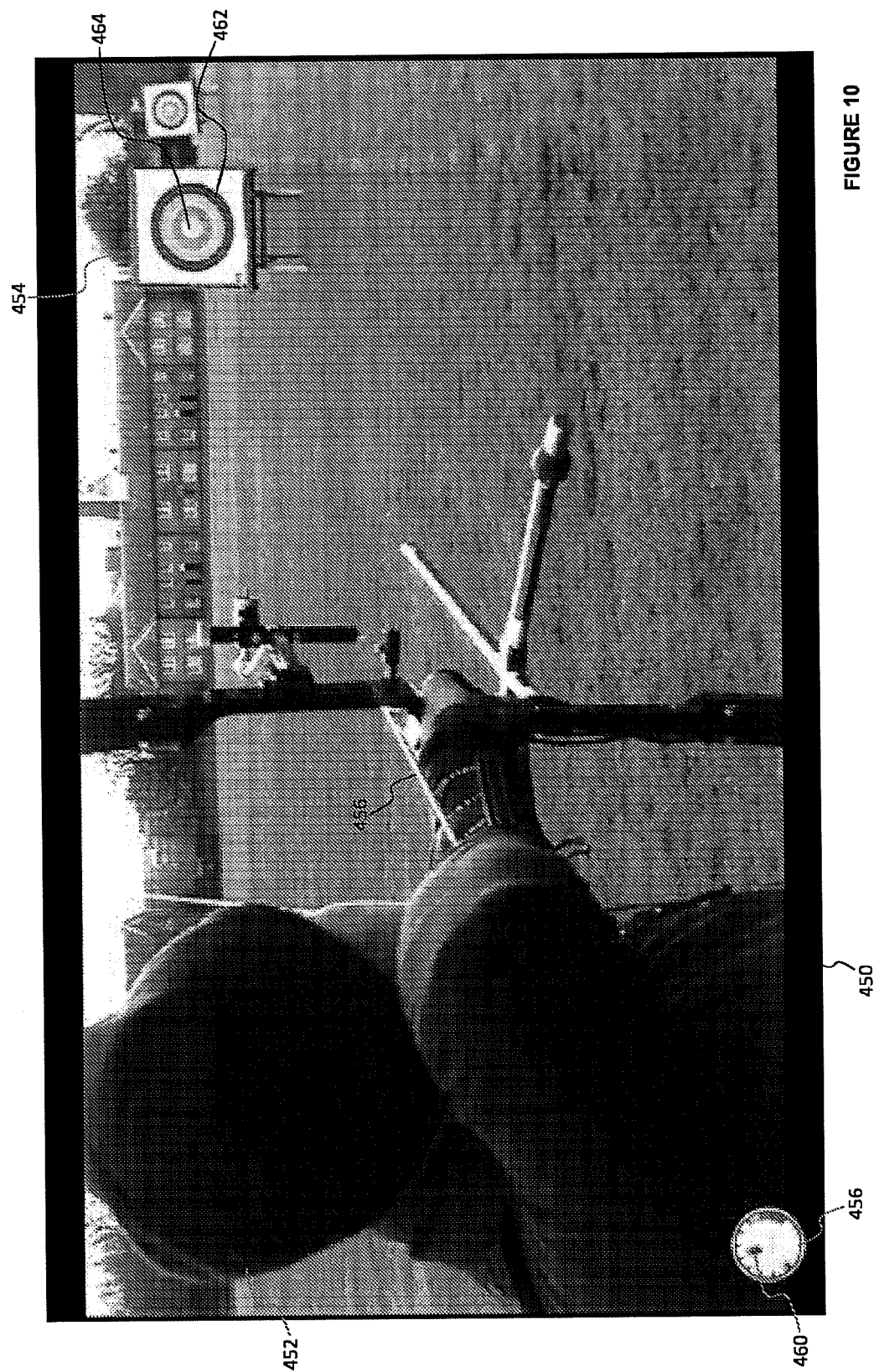
FIG. 10 is a screenshot of a scene output by the Myndplay System of FIG. 1, showing a first type of focus feedback meter.

FIG. 10 is an exemplary screen shot 450 of the output of a display generated by the Myndplay System 102. The video fragment 173 relates to an archery event where an archer 452 is taking aim at a target 454. Here the subject 106 has to concentrate on the target 454 and the level of concentration as measured by the sensors 108 and sent to the Myndplay System 102 determines how close to the centre of the target 454 the arrow 456 hits when fired by the archer 452.

The bottom left-hand corner of the screen shot 450 shows a computer-generated graphical dial of a meter 458 which shows in real time the degree of focus of the subject 106 being measured by the system. The needle 460 on the dial 458 fluctuates according to level of a measured focus parameter and provides valuable feedback to a subject 106 to enable then to concentrate on the task of getting their brain to focus on the target 454.

Depending on the degree of the focus parameter which is measured, one of three video fragments 173 will be played. The first, for a low value of the focus parameter, plays a video fragment 173 where the arrow 456 when fired misses the target 454 completely. The second, for a reasonable value of the focus parameter, hits the target 454 but on the outer ring 462. The third, for a high value of the focus parameter, hits the target 454 on the central circle 464.

It is to be appreciated that the provision of many meters such as the dial depicted by 458 on the screen 104 may be useful and the present embodiments are not restricted to one as shown. There are many neurologically determined parameters which can be sensed from the subject 106 at the same time. For example, the subject 106 can be both focussed and relaxed, as is the case with many athletes just before the start of a race. If other emotional state parameters such as a happiness, positivity or anger for example, are defined (whether as an output from the sensor 108 itself or by processing in the Myndplay system 102) each of their values could also be displayed in a corresponding relevant meter on the display. The number of meters displayed is not limited and many can be displayed to provide the subject with feedback on their current possibly complex sensed emotional state.

Figure 11B:
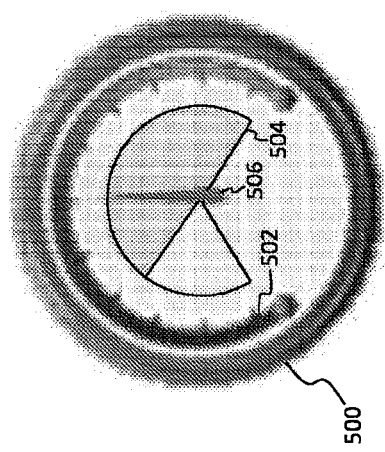
FIG. 11b is a part of a screenshot showing a relaxation meter which is overlaid on the video scene output by the Myndplay System.
Figure 11A:
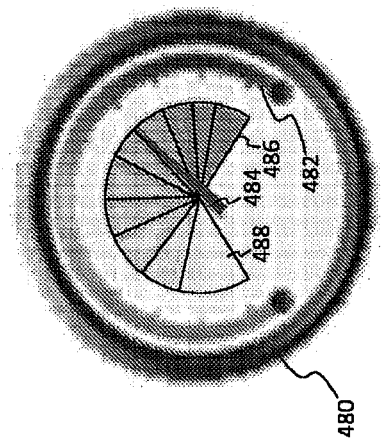
FIG. 11a is a part of a screenshot showing an alternative focus feedback meter which is overlaid on the video scene output by the Myndplay System.

FIG. 11a shows a close up of one of the dials 480 of a focus parameter meter of another embodiment to that shown in FIG. 10. In this dial 480, not only is the degree of focus shown in on outer arc 482 (which shows the total range of values for the parameter which are possible) but also segmentation of the region of travel of the needle 484 into distinct sectors 486 defines one of ten possible outcomes associated with this data analysis of the focus parameter. The first outcome is achieved if the needle 484 indicates the first sector 488. The other nine sectors 486 shown each are associated with a different outcome and so the subject 106 can see the likely outcome from the dial 480 of the meter.

FIG. 11b is a close up of one of the dials 500 of a relaxation parameter of another embodiment of the present invention. Here an outer arc 502 shows the possible range of values for this parameter. In this case there are only two possible states, relaxed and not relaxed. There is a portion 504 of the region of travel of the needle 506 which shows the outcome being considered relaxed. If the needle 506 indicates this region 504, (regardless of its position) a given outcome will be taken. If the needle 506 does not indicate this region 504, then the alternative outcome of not relaxed is determined.

Figure 12:
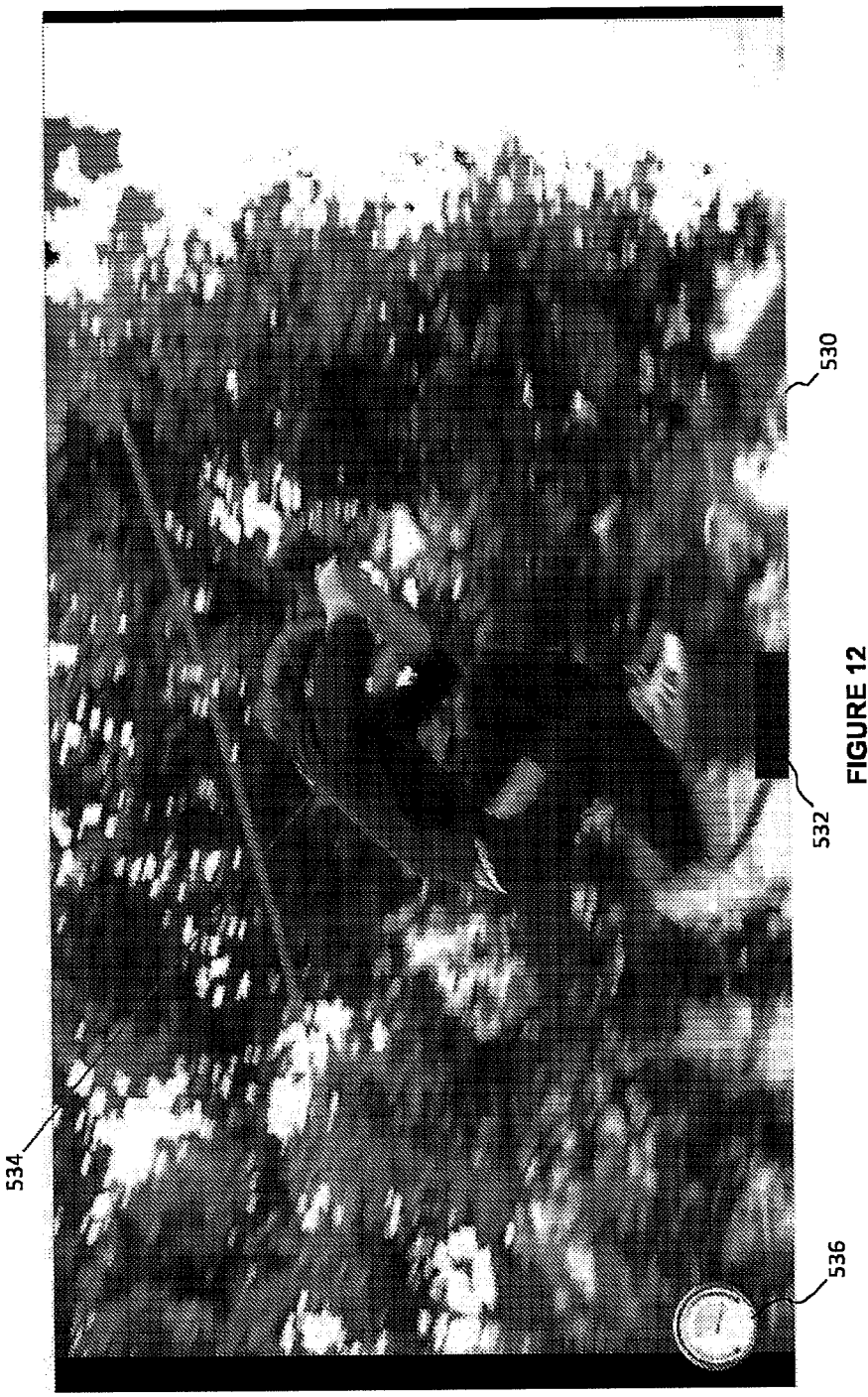
FIG. 12 is a screenshot of a scene output by the Myndplay System of FIG. 1, showing the alternative focus feedback meter of FIG. 11a and a resultant outcome displayed on the screen.

FIG. 12 is another exemplary screenshot 530 of the output of the display 104 generated by the Myndplay System 102. The video fragment 173 relates to an obstacle 532 which needs to be jumped over by a person 534. The measured focus parameter of the subject 106 is recorded and if it is above the predetermined threshold the video fragment 173 showing the person 534 jumping over the obstacle 532 is selected for playback on the display 104. In this case, as can be seen by the graphical icon 536 in the lower left-hand corner of the screenshot 530, the subject's concentration is sufficiently high to enable an outcome where the person 534 successfully jumps over the obstacle 532.

Figure 13A:
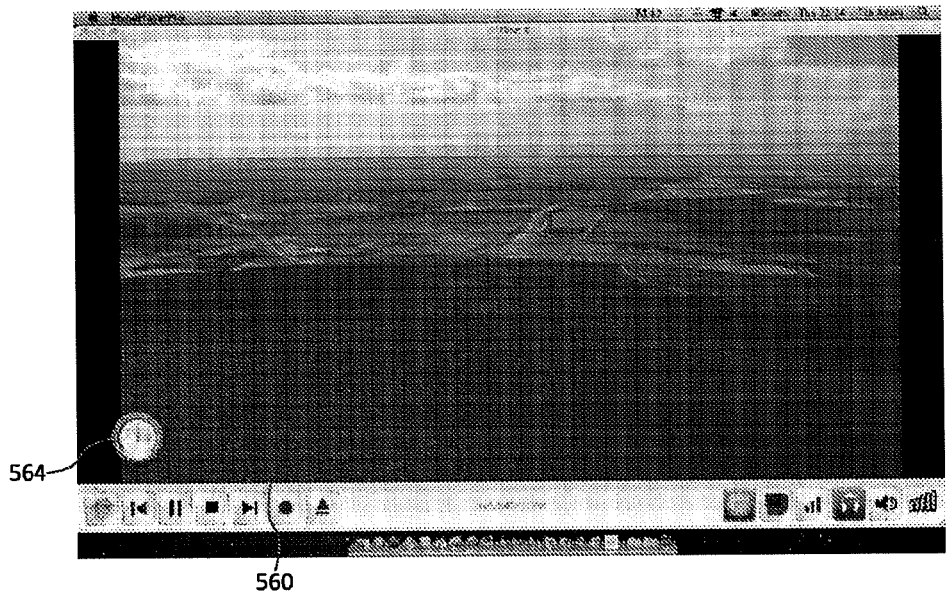
FIG. 13a is a screenshot of a scene output by the Myndplay System of FIG. 1, showing the relaxation feedback meter of FIG. 11b and a scene displayed on the screen.
Figure 13B:
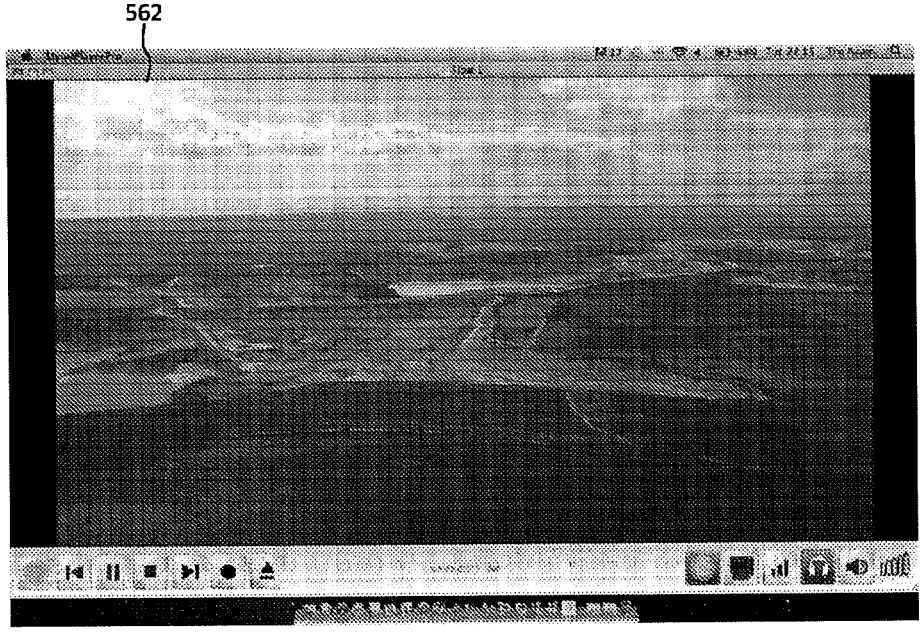
FIG. 13b is a screenshot of a resultant scene following that shown in FIG. 13a, showing the scene displayed as a result of successful relaxation.

FIGS. 13a and 13b show another example of screenshots 560, 562 of the output of the display 104 generated by the Myndplay System 102. The video fragment 173 relates to levitation of the viewer controlled by way of measuring a relaxation parameter of the subject. The measured relaxation parameter of the subject 106 is captured by the sensors 108 and recorded in the Myndplay System 102. If it is above the predetermined threshold, the video fragment 173 showing the levitation of the camera view (as would be seen by a person actually floating up into the air) is selected for playback on the display 104. This is the screenshot 562 shown in FIG. 13b. In this case, as can be seen by the graphical icon in the lower left-hand corner of the screenshot 560 of FIG. 13a, the subject's relaxation is sufficiently high to enable the outcome where the person successfully levitates off the ground providing a different view of the landscape depicted in 562. If not then the video fragment 173 which continues to show the original landscape depicted in 560 is selected and played back which represents the subject having their feet on the ground.

It is possible for the processor module 162 to carry out a mapping exercise where multiple subjects 106 viewing the display 104, can be grouped according to a selected parameter to see the responses to the stimuli of that selected group. One parameter which can be used is location such that the specific location of the subject 106 (e.g. front of the cinema) groups several responses together which can then be averaged or compared as a group to another group with a different location (back of the cinema). In this way, groups of responses can analysed and useful conclusion drawn about emotional reactions to visual stimuli presented on the display 104.

In this regard, it is also possible to apply different thresholds to different groups in the comparison steps discussed above to determine an outcome.

Also it is possible using the unique identifier for different subjects 106 to be grouped together to achieved a collective result. In one example, everyone can be asked to lift a weight off the ground and if the average concentration level (based on the focus signal) is over a threshold value, then the weight is lifted off the floor. Also results from different subjects can be used to create a competitive environment. For example, if carrying out a tug of war event, the processor module 162 can be configured via the directions file 170 to ensure that each member of one group contributes to the overall value for that group. In this case, one group's results can be focussing pulling in one direction and the other group's results for focus can be directed to pulling in the other direction. Accordingly, emotional responses to visual stimuli or a subject's control of their emotional state can be used competitively as well as collectively.

It is to be appreciated that the present embodiment only acts to cause a binary outcome (success or failure). In the present embodiment, these outcomes determine the position within the overall outcome tree traversal the subject is at and hence what will be output next to the display.

Whilst there is still a possibility of an indeterminate result, this is coupled with a repeat of that process until a determinate result (success or failure) is achieved. This is very different to a computer game where input is specifically received to control the game play with degrees of freedom being recorded and reflected in the game play and where control of a player's representation on screen is attempted.

It is also possible using the present embodiment to monitor the level of a parameter (focus or relaxation) and compare the read values with a predetermined threshold level. Once that threshold has been reached, not only can an action be taken but the video output to the display 104 can be stopped before reaching the end of the video fragment 173 being played. This can be considered to be a video playback interrupt and is useful where a result has been achieved quickly within a given time frame. In such a case, playback of the next video fragment 173 to be presented to the subject can then be commenced earlier than would otherwise be the case. This advantageously shortens the overall time of the whole outcome tree traversal from start to end.

The present embodiment is configured to detect when a subject blinks. This blink detection parameter is created from analysis for the composite raw data signal which is sent to the Myndplay System 102. A digital high-pass filter may be applied to the input signal, this is beneficial as there is a strong correlation between when a subject 106 blinks and the amplitude of a high-pass filtered raw data signal of the sensor activity. Accordingly, a signed sixteen-bit amplitude signal which is digitally high-pass filtered provides a signal with an indication of the subject blinking.

It is also possible to create new parameter from the received parameters of focus, relaxation, raw (total signal), Alpha, Beta, Theta, Delta and Gamma. One such signal has been described above in relation to Blink detection. Another is a 'Zone' signal which is an average between the relaxation and focus signals which can simplify the processing required to make a decision. Any new parameters which are required are created in the pre-processor as has been described above. The Zone signal may be a very useful signal to display on a signal dial of a meter when feeding back to the subject on the screen. This is because it will have a greater range of operation than focus or relaxation alone.

The sensors 108 used for each subject also can output a current Signal to Noise Ratio (SNR) for the signals transmitted. The present embodiment in the pre-processor 192 can be arranged to use this signal as a quality measure and to reject sensor data if it has been recorded with a value of the SNR which is below a predetermined threshold. This advantageously makes the output more accurate and removes distortion of outcomes.

Figure 14:
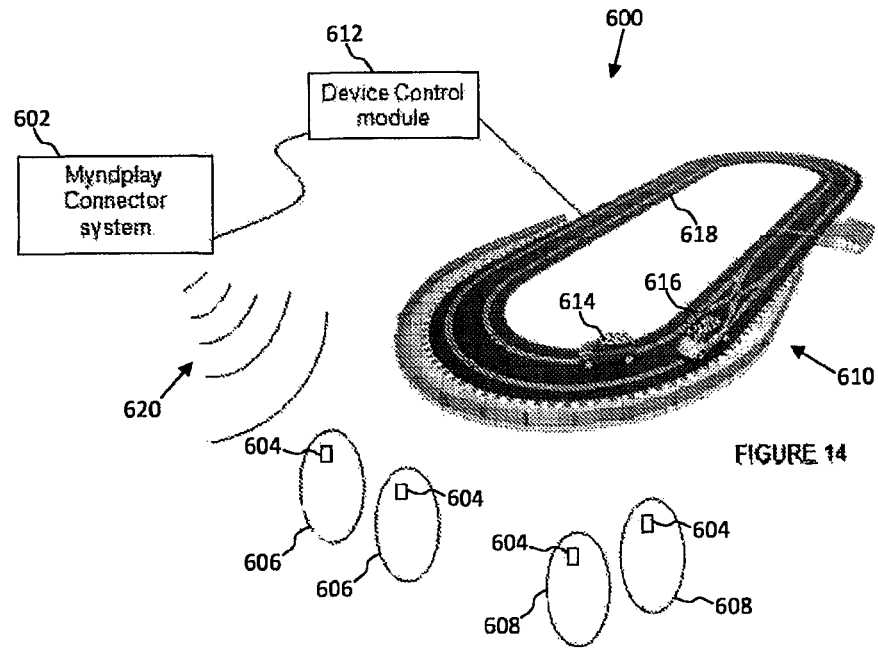
FIG. 14 is a schematic block diagram showing a Myndplay Connector System used to control the physical device such as toy race cars on a racetrack, in accordance with another embodiment of the present invention.

Referring now to FIG. 14 there is shown an alternative embodiment of the present invention 600. This embodiment relates to a Myndplay Connector System 602 which is different to the Myndplay System 102 described above in that it does not control the output of video clips to a display. However in many other respects the Myndplay Connector system works in a similar manner and so only the differences will be described herein. The Myndplay Connector System 602 is arranged to receive EEG signals and signal parameters from sensors 604 provided on subjects' 606, 608 heads. However, these received subject data are used to control a physical device 610 rather than a visual display 104. In the embodiment shown in FIG. 14, the output of the Myndplay Connector System 602 is sent to a device control module 612 which in turn drives electrically powered race cars 614, 616 on a racetrack. Two groups of subjects 606, 608 are shown with one group (comprising subjects 606) controlling one race car 614 and the other group (comprising subjects 608) controlling the other race car 616.

In this regard, the Myndplay Connector System 602 has a similar communications module to that described above (Myndplay System 102) in that it senses (using Bluetooth) signals 620 generated by sensors 604 worn around a subject's 606, 608 head. The sensors 604 are as described in the earlier embodiments in that they generate outputs of parameters measured from the subject's 606, 608 brain.

However, in this embodiment four subjects 606, 608 are shown and the signals 620 from each subject are used to create two output signals to the Device Control Module 612. More specifically, rather than one composite video signal being output, two control signals are output corresponding to each race car 614, 616. These composite signals are generated from each subject grouping to control the race car associated with that subject group.

In this example, the speed of the travel of the race cars 614, 616 is controlled by the subject's 606, 608 degree of focus on their vehicle. The greater the focus the greater the output signal sent to the Device Control Module 612 and hence the faster the race cars 614, 616 travels around the track 618. The Device Control Module 612 has knowledge of the range of amplitudes required to control the speed of the race cars over their correct range. Thus, the Device Control Module 612 converts the control signals received from the Myndplay Connectar System 602 into relatively-sized device control signals of the appropriate magnitude.

The way in which the Myndplay Connector of the present embodiment handles this is described below. It is to be appreciated that the Myndplay Connector of this embodiment is implemented as a computer-implemented software application.

Figure 15:
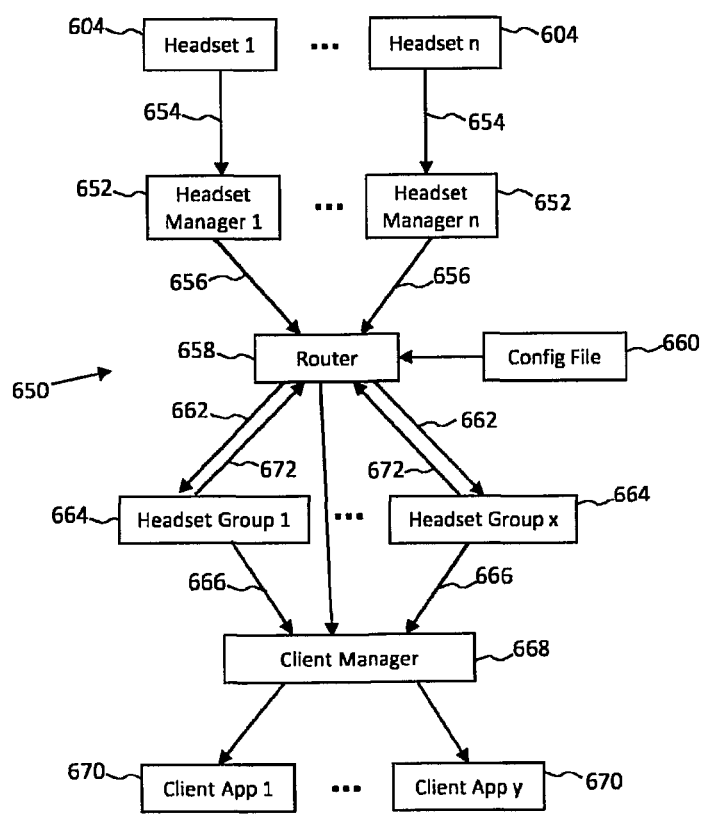
FIG. 15 is a schematic block diagram showing the components of the Myndplay Connector System of FIG. 14.

Referring to FIG. 15 the structure 650 of the Myndplay Connector System 602 is shown. The structure 650 comprises a plurality of Headset Managers 652 (Sensor managers) which receive a stream of sensor data 654 from subjects 606, 608. Each subject 606, 608 has a unique Headset Manager 652. All of the outputs 656 of the headset managers 652 are sent to a router 658 where a decision is made on how to process the incoming data. This is where the analysis of the sensed parameters occurs with respect to the configuration file 660. The output 662 of the router 658 is to the predetermined groups 664. There may be several groupings here depending on the specific application to which the Myndplay Connector System 602 is being put. The outputs 666 of the Headset groupings 664 are then sent to the Client Manager 668 (the Device Control Module in this embodiment 612) which in turn drives each of the client applications 670 (race cars 614, 616 in this embodiment).

The use of the Client Manager 668 and the client applications 670 instead of the Device Control Module 612 and the race cars 614, 616 is merely to show the generic nature of the structure 650 of the Myndplay Connector System 602. It is to be appreciated that the detailed description above has described the software embodiment from which the actual embodiment described above is readily derivable as it is a subset of the software described. Rather than the visual output being provided to a display (including a new video clip and feedback on the brainwave activity of the subject), the output controls the movement of the toy car being driven around the track. This movement including the speed of the car indicates the level of a parameter (such as focus) related to a mental state of the subjects who are controlling that car and so this movement also provides feedback as to the subject's mental state. In another embodiment, however, this feedback on the mental state could also be provided on a visual monitor which could display a meter as in the previous embodiment. This would have the beneficial effect of providing the subjects with a quantifiable measure of their control but would come at the expense of requiring another piece of equipment. However if the display is that of a mobile device such as a laptop, tablet computer or mobile device such as a smart phone, then the subjects may already have this additional equipment available and a downloadable app (application) could provide additional support for the control, such as recording historical information about previous sessions and guidance as to how best to control the movement of the toy cars.

More specific detail on the Myndplay Connector System 602 is provided below.

The Myndplay Connector System 602 is in essence a device to combine the data from multiple headsets 604 into a smaller number of headset groups 664, and then output this data to multiple listeners.

The elements of the system as shown in FIG. 15 are:

1. Headset Managers 652 (listeners)—these handle maintaining a connection to the headset 604. The basic version connects to headsets 604 directly via Bluetooth or some other wireless direct communication protocol. A version listens to headset data coming via a network port, thereby opening up the possibility of having the headset 604 remote from the listening machine, or being able to use a farm of computers to handle very large numbers of devices. Another embodiment takes input from another aggregator, thereby enabling a distributed network of aggregators that push data to each other or to a master server. The headsets managers 652 are responsible for maintaining the connection between the router 658 and each of the headsets 604, including attempting to reconnect if the connection is severed.

2. Headset group configuration—This information is held in a configuration file 660 that is loaded on start-up and may be manipulated and saved from the user interface. It defines an output group name, an algorithm to use for that group, and which headset managers 652 are to be directed to that group.

3. Headset groups 664—Receive data destined for them, apply the aggregation algorithm as configured in the headset group configuration, and pass the new value back 672 to the router 658.

4. Application connections—Each of these objects represents a connection initiated by client application 670. Initially this is an application connecting to a TCP/IP port, but it can in other embodiments be other methods of connection. It handles maintaining a connection to the client application 670, and sending the data as provided by the router 658.

5. Router 658—The heart of the system 650 that is responsible for receiving data from the headset managers 652, and sending 662 that data to the appropriate headset group 664 as defined in the headset group configuration file 660. The router 658 is responsible for receiving aggregated data from the headset groups 664, and sending using the client manager 668 it to all the client applications 670.

Having described several embodiments of the present invention it is to be appreciated that the present embodiments are exemplary only and that the skilled person will be able to carry out modifications and variation to the embodiments without inventive activity without departure from the spirit and scope of the invention as set out in the accompanying claims. For example it is possible that in place of visual feedback using meters on the visual display other sensory feedback stimuli could be used. For example, an auditory response could be provided to feedback to the observer how well they are doing in trying to focus and relax.

The invention claimed is:

1. A method of controlling a video clip player; the method comprising:
sending a control signal from a controller to the video clip player to output a pre-recorded video clip to a display;
using a sensor to sense EEG signals from the brain of an observer of the displayed video clip;
transmitting the sensed EEG signals from the sensor to the controller;
processing the received EEG signals to determine an outcome, the outcome being achieved by the received signal comprising a predetermined frequency or a predetermined combinations of frequencies of EEG signals above a threshold level for a predetermined period of time, the processing step including filtering the EEG signal through a band-pass filter to detect either Alpha, Beta, Theta, Delta or Gamma brainwaves and combining the results of the band-pass filtering of the EEG signal to detect a state of mind of the user; and
controlling the video clip player in response to the determined outcome, the controlling step comprising:
selecting a next pre-recorded video clip to be output by the video clip player from a plurality of stored pre-recorded video clips; and
instructing the video clip player to output the selected pre-recorded video clip to the display for presentation to the observer.

2. The method according to claim 1, wherein the transmitting step comprises transmitting the EEG signals wirelessly to the controller.

3. The method according to claim 2, further comprising monitoring a wireless connection between the sensor and the controller over which the EEG signals are transmitted and if the connection is broken, sending a control signal to the video clip player.

4. The method according to claim 3, wherein the sending step comprises sending a pause signal to the video clip player and wherein the method further comprises sending an unpause signal when the monitoring step determines that the wireless connection is re-established.

5. The method according to claim 3, wherein the sending step comprises sending a stop signal to the video clip player to stop the output of the current video clip being played and wherein the method further comprises sending a restart signal to restart the current video clip from its beginning when the monitoring step determines that the wireless connection is re-established.

6. The method according to claim 1, wherein the processing step comprises filtering the EEG signals though a high-pass filter to detect EEG artefacts caused by the observer blinking their eyes.

7. The method according to claim 1, wherein the processing step comprises combining the results of the band-pass filtering of the EEG signal to detect a focus parameter correlated with focus of the observer.

8. The method according to claim 7, wherein the processing step comprises combining the results of the band-pass filtering of the EEG signal to detect a relaxation parameter correlated with relaxation of the observer.

9. The method according to claim 8, wherein the processing step comprises averaging the focus parameter and the relaxation parameter to derive a Zone parameter.

10. The method according to claim 1, further comprising outputting a parameter as a graphical overlay on the selected video clip, the graphical overlay indicating the current level of the parameter and thus providing feedback on the display to the observer about their state of mind.

11. The method according to claim 1, wherein the outputting step comprises outputting the graphical overlay in the form of a meter showing the level of the parameter which is currently being recorded.

12. The method according to claim 1, wherein the processing step comprises reading a directions file which stores threshold levels, combinations of EEG filtered signals, time periods over which such thresholds are to be exceeded and resultant successful/unsuccessful outcomes.

13. The method according to claim 1, wherein the time period over which the EEG signal is considered ends and the controlling step is completed before the end of the current pre-recorded video clip being output by the video clip player.

14. The method according to claim 13, further comprising generating an interrupt command and sending the same to the video clip player; said interrupt command causing the current video clip being played to stop being played prematurely and the next pre-recorded video clip to start being played.

15. The method according to claim 1, further comprising configuring the video clip player to create a fade transition between the end of the current video clip being played and the beginning of the next pre-recorded video clip to be played.

16. The method according to claim 1, wherein the comparing step further comprises using a state machine to determine the outcome.

17. The method according to claim 1, further comprising predetermining a plurality of active time periods during control of the video clip player, wherein the processing step is carried out only during the active time periods.

18. The method according to claim 1, wherein the pre-recorded video clips are sequential in nature and the method further comprises providing a current position identifier for assisting in non-linear traversal of the sequential pro-recorded video clips.

19. The method according to claim 1, wherein the using step comprises using a plurality of sensors to sense EEG signals from the brains of a plurality of observers of the displayed video clip;
the transmitting step comprises transmitting each of the sensed EEG signals from the sensors to the controller;
the processing step comprises processing the plurality of received signals to determine an outcome, the processing comprising averaging the EEG signals from each of the plurality of sensors for a predetermined frequency or a predetermined combinations of frequencies and the outcome being achieved by an average of the received signals being above a threshold level for a predetermined period of time.

20. The method according to claim 19, wherein the transmitting step comprises transmitting a unique identifier of each sensor and the processing step comprises using the unique identifiers to group together signals from predetermined ones of the sensors.

21. The method according to claim 20, wherein the using step comprises grouping together sensors from a geographical area.

22. The method according to claim 19, wherein the processing step comprises pre-processing the sensed EEG signals and comparing the pre-processed signals with the threshold level.

23. The method according to claim 22, wherein the pre-processing step comprises averaging at least some of the plurality of received EEG signals.

24. The method according to claim 22, wherein the pre-processing step comprises aggregating together at least some of the plurality of received EEG signals.

25. The method according to claim 24, wherein the aggregating step comprises aggregating the sensed EEG signals in to a plurality of groups, and the comparing step comprises comparing the pre-processed signals with a plurality of different threshold levels.

26. The method according to claim 22, further comprising recording the sensed EEC data in a data file over the time period and accessing the recorded data in the pre-processing step.

27. A control system for controlling the presentation of pre-recorded video clips output to a display; the control system comprising:
a video clip player for outputting a series of pre-recorded video clips;
a controller for sending a control signal to the video clip player to output a selected pre-recorded video clip to the display;
a communications module for receiving EEG signals sensed from the brain of an observer of the displayed video clip;
a processor for processing the received EEC signals to determine an outcome, the outcome being achieved by the received signal comprising a predetermined frequency or a predetermined combinations of frequencies of EEG signals above a threshold level for a predetermined period of time, and the processor filtering the EEG signal through a band-pass filter to detect either Alpha, Beta, Theta, Delta or Gamma brainwaves and combining the results of the band-pass filtering of the EEG signal to detect a state of mind of the user; and
a data store of a plurality of pre-recorded video clips;
Wherein the processor is arranged to control the video clip player in response to the determined outcome, the control comprising selecting a next pre-recorded video clip to be output by the video clip player from the plurality of stored pre-recorded video clips and instructing the video clip player to output the selected pre-recorded video clip to the display for presentation to the observer.

28. A combination of the control system according to claim 27, a display driven by the control system and at least one EEG sensor for measuring EEG brainwaves of an observer of the display.

29. A method of operating a controller of a device having a visible operation parameter; the method comprising:
sending an instruction signal from a connector module to the controller to output a control signal for controlling the visible operation parameter of the device;
using a sensor to sense EEG signals from the brain of an observer of the device;
transmitting the sensed EEG signals from the sensor to the connector module;
processing the received EEG signals to determine an outcome, the outcome being achieved by the received signal comprising a predetermined frequency or a predetermined combinations of frequencies of EEG signals above a threshold level for a predetermined period of time, the processing step including filtering the EEG signal through a band-pass filter to detect either Alpha, Beta, Theta, Delta or Gamma brainwaves and combining the results of the band-pass filtering of the EEG signal to detect a state of mind of the user; and manipulating the device controller in response to the determined outcome, the manipulating step comprising:

selecting a next pre-determined variation of the operation parameter to be output by the device controller from a plurality of variations; and instructing the device controller to output the selected pre-determined variation of the operation parameter to the device for altering the visible operation of the device to the observer.

30. A control system for controlling the operation of a device having a visible operation parameter; the system comprising:

a device controller for outputting a control signal for controlling the visible operation parameter of the device;

a connector system for sending an instruction signal to the device controller to output a selected pre-determined variation to the device; the connector system including:

a communications module for receiving EEG signals sensed from the brain of an observer of the visible operation of the device;

a processor for processing the received EEG signals to determine an outcome, the outcome being achieved by the received signal comprising a predetermined frequency or a predetermined combinations of frequencies of EEC signals above a threshold level for a predetermined period of time, the processor filtering the EEG signal through a band-pass filter to detect either Alpha, Beta, Theta, Delta or Gamma brainwaves and combining the results of the band-puss filtering of the EEG signal to detect a state of mind of the user; and wherein the processor is arranged to manipulate the device controller in response to the determined outcome, the manipulation comprising:

selecting a next pre-determined variation of the operation parameter to be output by the device controller from a plurality of variations; and instructing the device controller to output the selected pre-determined variation to the device for altering the visible operation of the device to the observer.

\* \* \* \* \*